(12) United States Patent
Yosui

(10) Patent No.: US 9,672,956 B2
(45) Date of Patent: Jun. 6, 2017

(54) HIGH-FREQUENCY SIGNAL LINE AND MANUFACTURING METHOD THEREOF

(71) Applicant: Murata Manufacturing Co., Ltd., Nagaokakyo-shi, Kyoto-fu (JP)

(72) Inventor: Kuniaki Yosui, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 156 days.

(21) Appl. No.: 14/558,945

(22) Filed: Dec. 3, 2014

(65) Prior Publication Data

US 2015/0087353 A1    Mar. 26, 2015

Related U.S. Application Data

(63) Continuation of application No. PCT/JP2013/078327, filed on Oct. 18, 2013.

(30) Foreign Application Priority Data

Oct. 31, 2012 (JP) ................. 2012-240092

(51) Int. Cl.

| | |
|---|---|
| H01P 3/08 | (2006.01) |
| H01B 7/04 | (2006.01) |
| H01B 7/00 | (2006.01) |
| H01B 13/06 | (2006.01) |
| H01B 17/56 | (2006.01) |
| H04M 1/02 | (2006.01) |

(52) U.S. Cl.
CPC .......... *H01B 7/041* (2013.01); *H01B 7/0018* (2013.01); *H01B 13/06* (2013.01); *H01B 17/56* (2013.01); *H01P 3/085* (2013.01); *H04M 1/0202* (2013.01); *H04M 1/0277* (2013.01); *Y10T 156/1039* (2015.01)

(58) Field of Classification Search
CPC .. H01P 3/08; H01P 3/081; H01P 3/082; H01P 3/085
USPC .................................................. 333/238, 246
See application file for complete search history.

(56) References Cited

U.S. PATENT DOCUMENTS

2012/0274423 A1    11/2012   Kato

FOREIGN PATENT DOCUMENTS

| JP | 10-313203 A | 11/1998 |
|---|---|---|
| JP | 2005-123995 A | 5/2005 |
| JP | 2010-226450 A | 10/2010 |
| WO | 2012/073591 A1 | 6/2012 |
| WO | 2012/074100 A1 | 6/2012 |

OTHER PUBLICATIONS

Official Communication issued in International Patent Application No. PCT/JP2013/078327, mailed on Jan. 21, 2014.

*Primary Examiner* — Stephen E Jones
(74) *Attorney, Agent, or Firm* — Keating & Bennett, LLP

(57) ABSTRACT

A high-frequency signal line includes a linear signal line and a first ground conductor provided at a dielectric body to extend along the dielectric body. The first ground conductor includes a first main surface and a second main surface opposed to each other in a direction of lamination. A strip-shaped protrusion extending along the signal line is provided on the second main surface of the first ground conductor.

16 Claims, 24 Drawing Sheets

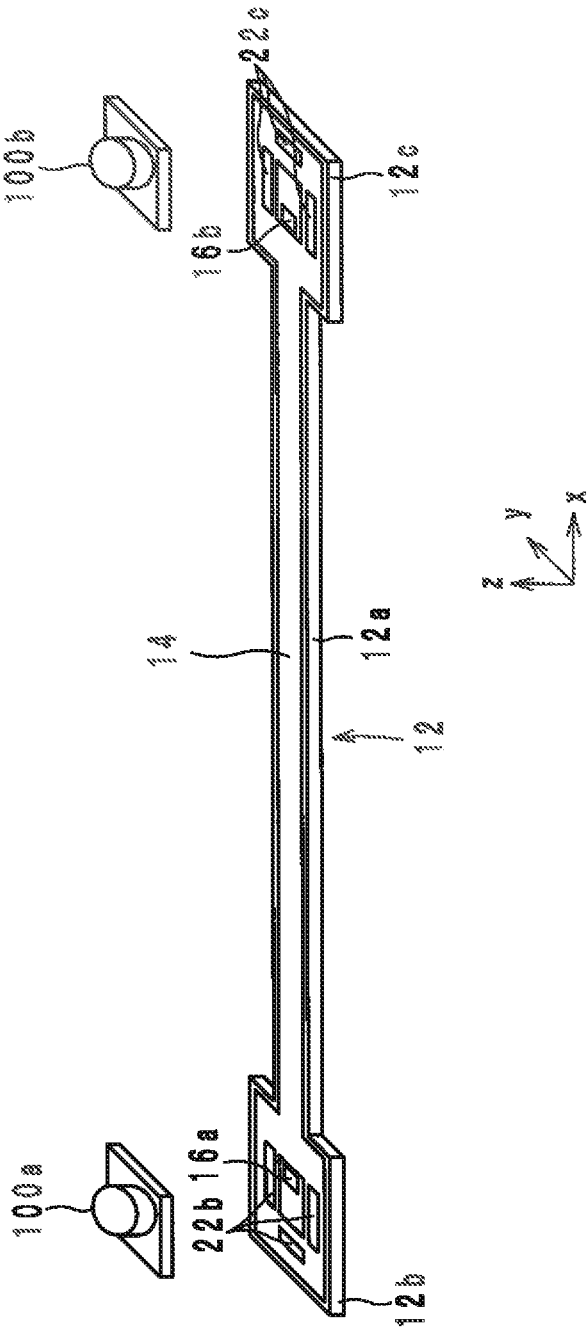

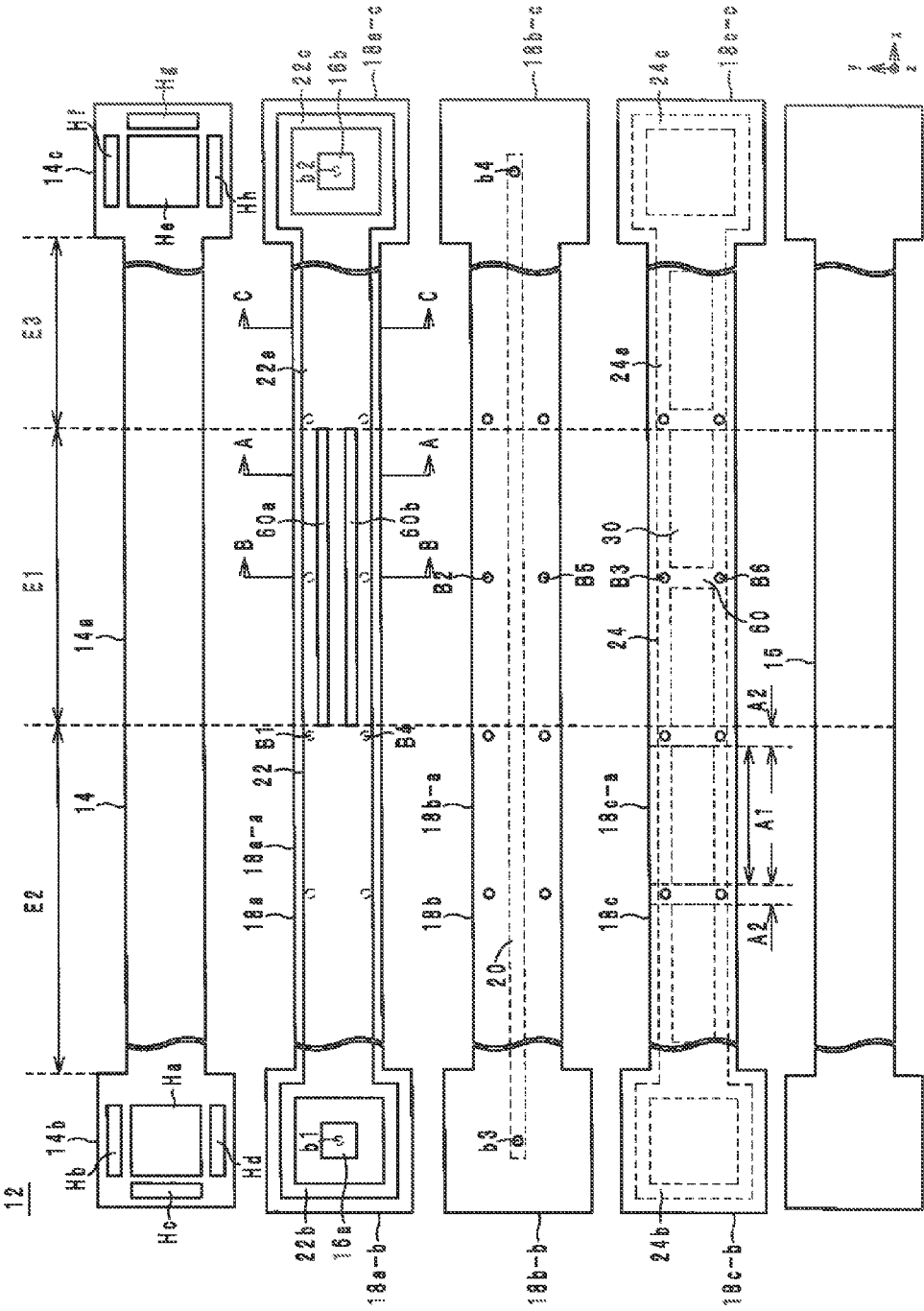

F I G. 3
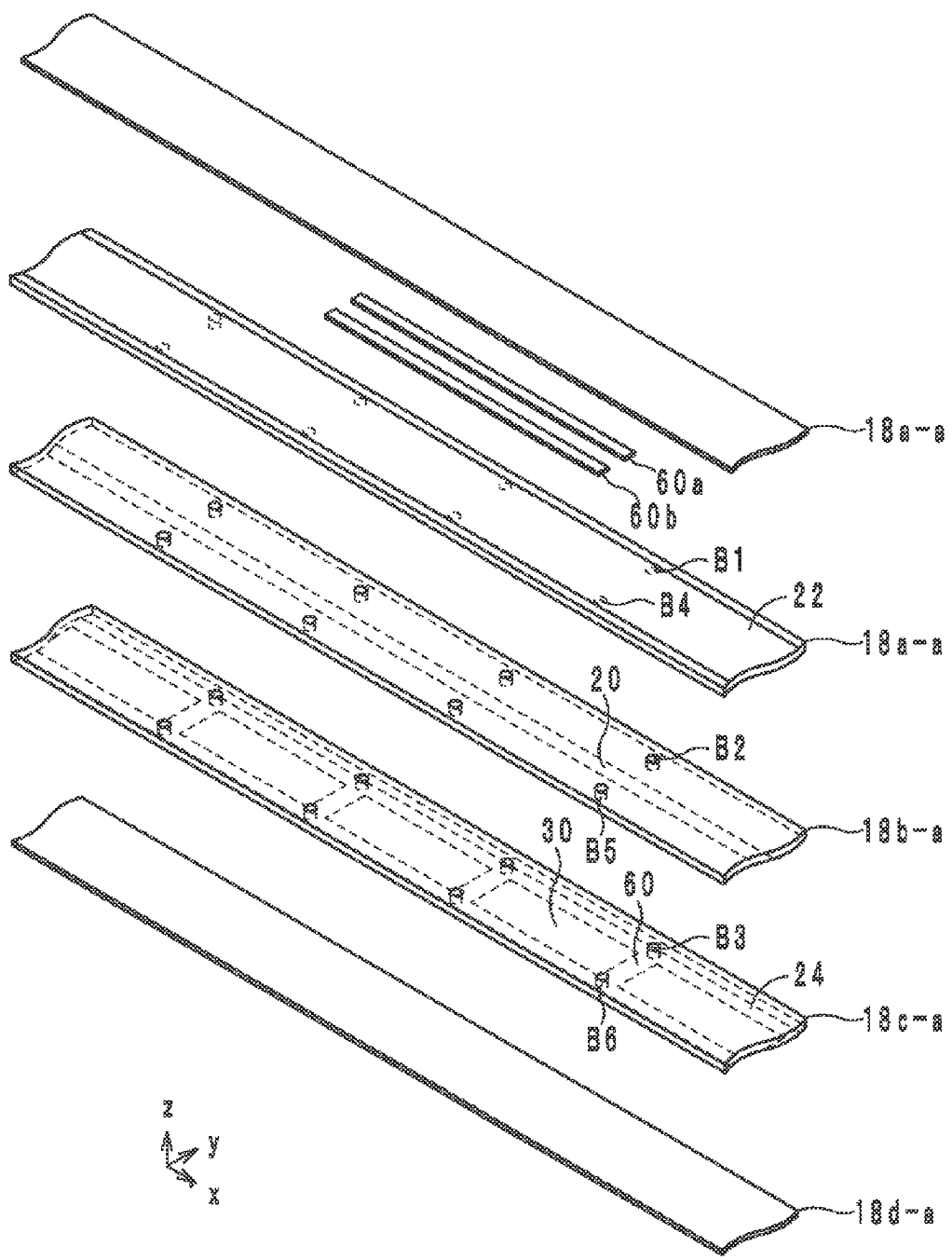

F I G . 1 3
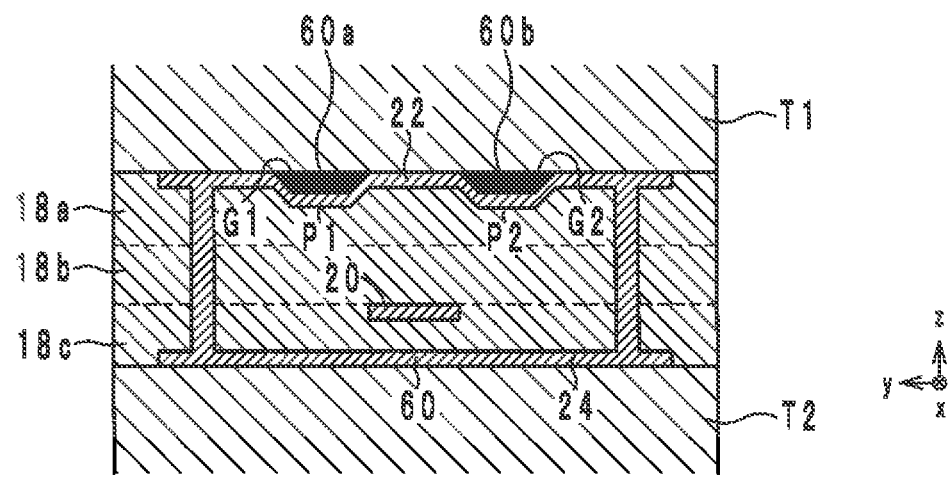
F I G . 1 4
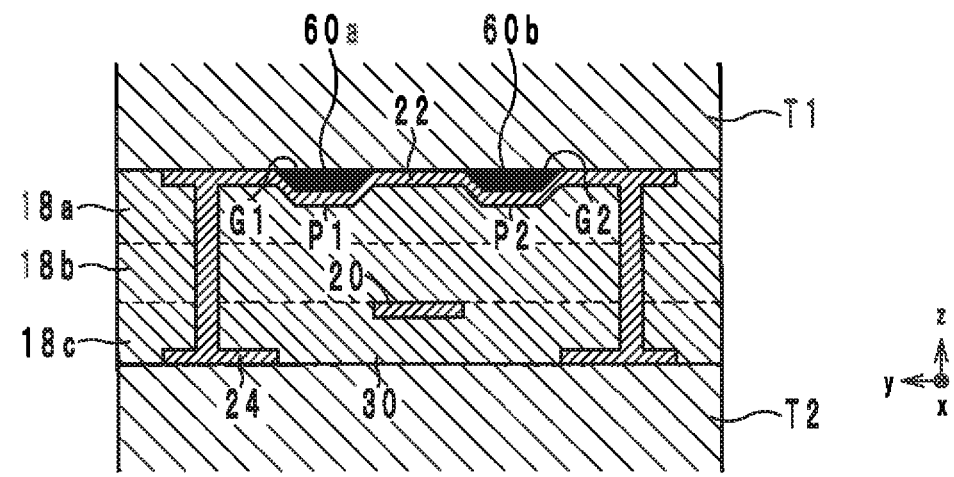

FIG. 15
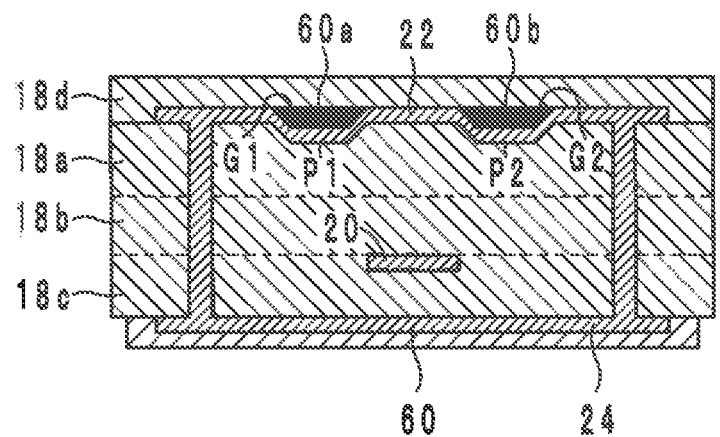
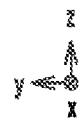
FIG. 16
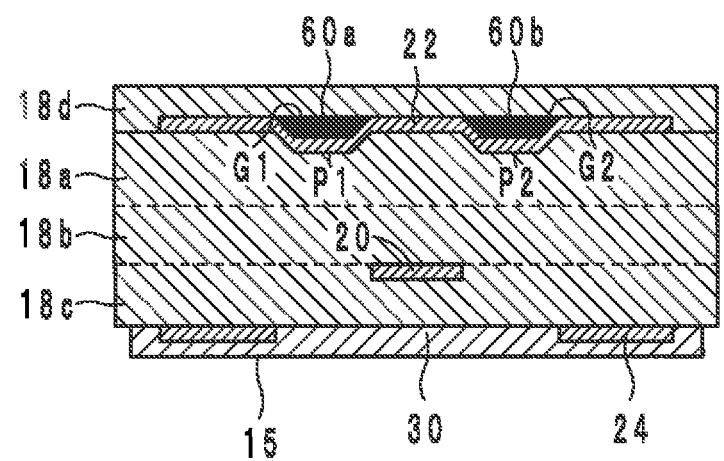
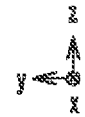

F I G . 2 0
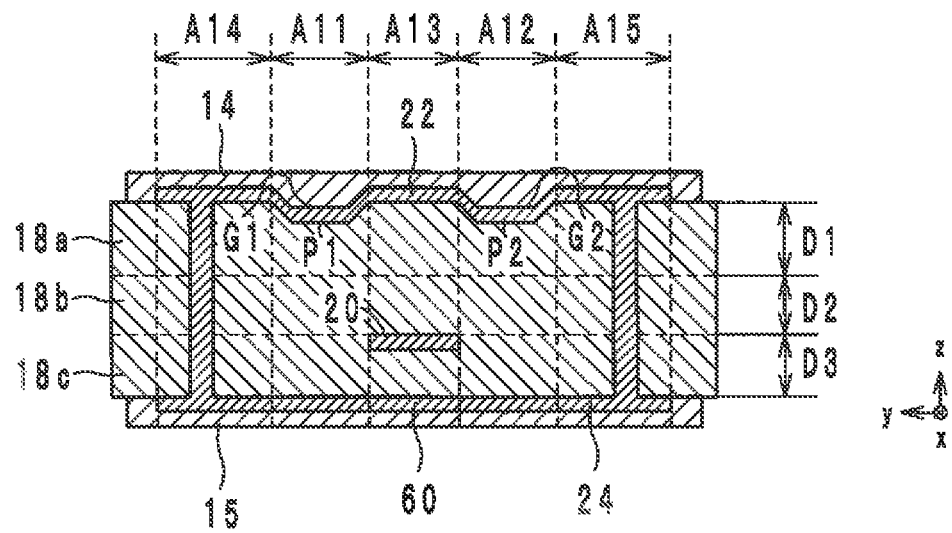
F I G . 2 1
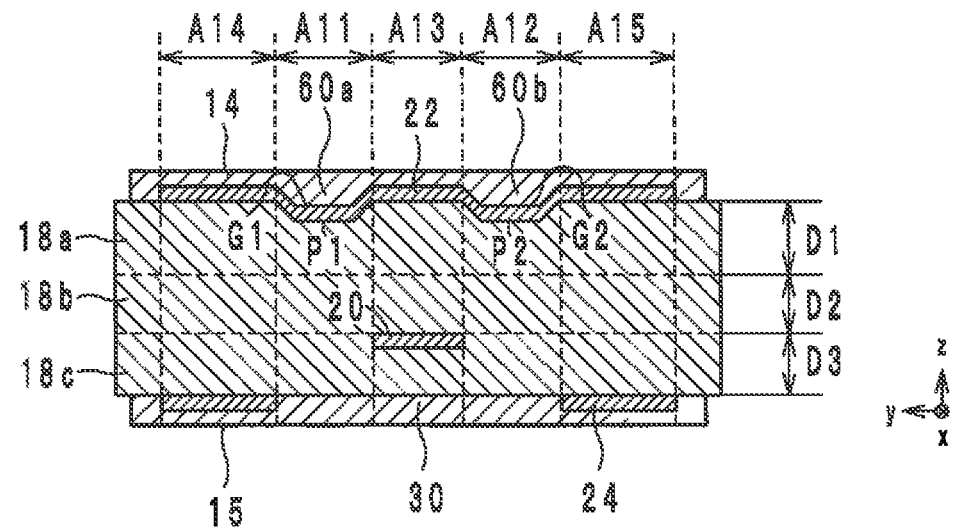

F I G. 23
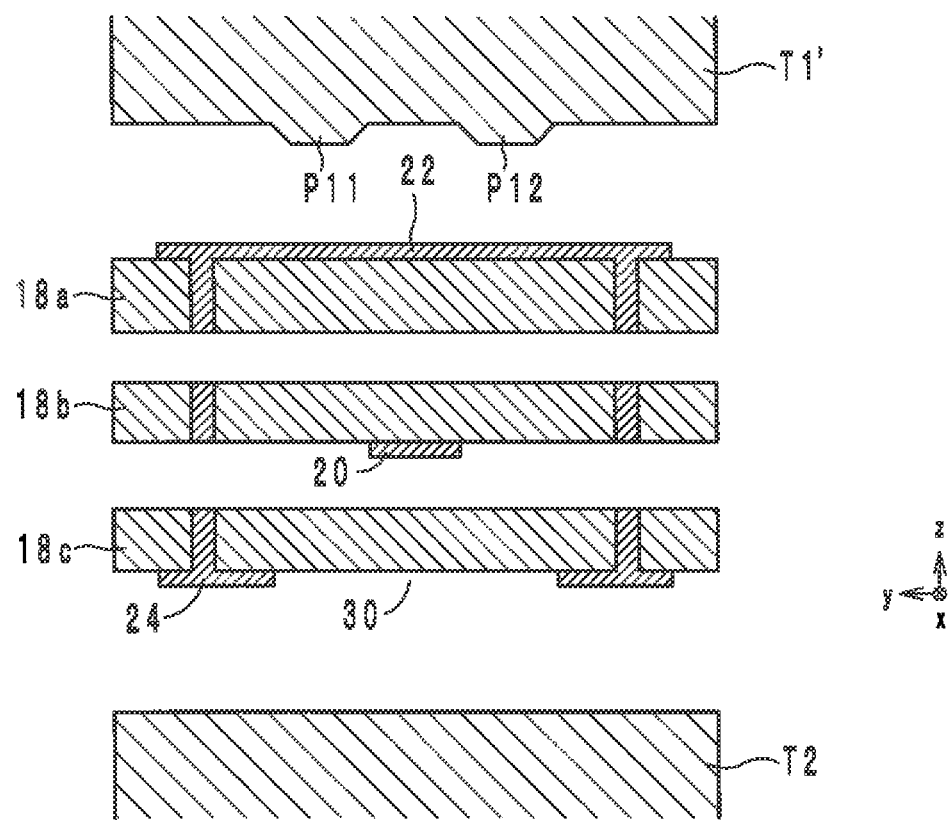

F I G . 3 1
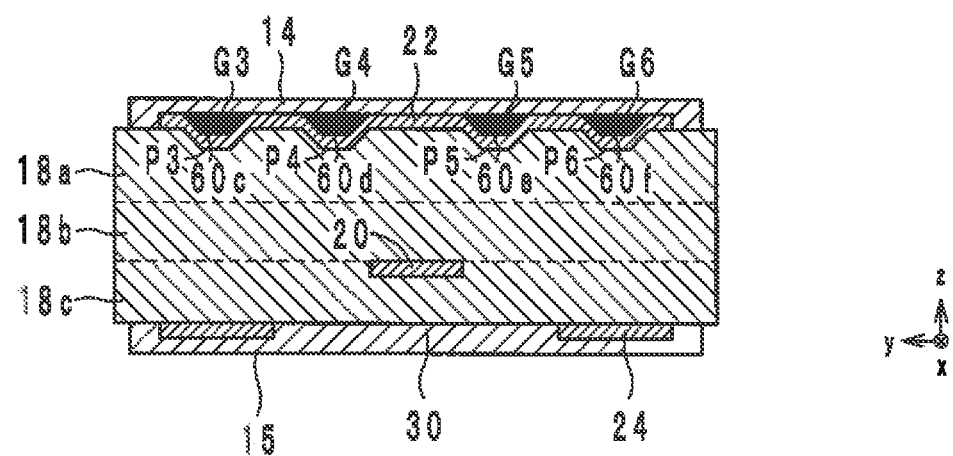

HIGH-FREQUENCY SIGNAL LINE AND MANUFACTURING METHOD THEREOF

BACKGROUND OF THE INVENTION

1. Field of the Invention

The present invention relates to a high-frequency signal line and a manufacturing method thereof, and more particularly to a high-frequency signal line preferably for use in high-frequency signal transmission and a manufacturing method thereof.

2. Description of the Related Art

As a conventional high-frequency signal line, for example, a high-frequency signal line disclosed in WO 2012/073591 is known. The high-frequency signal line includes a dielectric body, a signal line and two ground conductors. The dielectric body is a laminate of dielectric sheets formed of a flexible material, and extends in a predetermined direction. The signal line is a linear conductor provided on one of the dielectric sheets. The two ground conductors are provided on any of the dielectric sheets so as to sandwich the signal line in the direction of lamination. Accordingly, the signal line and the two ground conductors form a stripline structure. The high-frequency signal line is used, for example, in an electronic device to connect two circuit boards.

The high-frequency signal line disclosed in WO 2012/073591 is bent when used in an electronic device. To this end, the dielectric body of the high-frequency signal line is flexible. However, since the whole high-frequency signal line is flexible, even a portion supposed to extend straight without bending may bend. In this case, in the bending portion of the high-frequency signal line, the interval between the signal line and each of the ground conductors becomes smaller, and it is likely that greater capacitance is created between the signal line and each of the ground conductors. Accordingly, the characteristic impedance in the bending portion of the high-frequency signal line becomes lower than the characteristic impedance before bending. Thus, there is a risk in the high-frequency signal line disclosed in WO 2012/073591 that the characteristic impedance shifts from a designed value (for example, $50\Omega$).

SUMMARY OF THE INVENTION

Preferred embodiments of the present invention provide a high-frequency signal line capable of diminishing or eliminating the risk of a shift of the characteristic impedance from a designed value.

A high-frequency signal line according to a preferred embodiment of the present invention includes a linear dielectric body including flexible dielectric sheets laminated together; a linear signal line provided at the dielectric body to extend along the dielectric body; and a first ground conductor provided at the dielectric body to extend along the signal line. The first ground conductor includes a first main surface and a second main surface opposed to each other in a direction of lamination. A strip-shaped protrusion extending along the signal line is provided on the second main surface of the first ground conductor.

A manufacturing method of a high-frequency signal line according to a preferred embodiment of the present invention includes a process of forming a dielectric body including a step of forming a linear signal line on a first dielectric layer; a step of forming a first ground conductor on a second dielectric layer; and a step of laminating and pressure-bonding the first dielectric layer and the second dielectric layer together such that the first ground conductor and the signal line face each other. In the step of laminating and pressure-bonding the first dielectric layer and the second dielectric layer together, a strip-shaped protrusion protruding toward the signal line and extending along the signal line is formed on the first ground conductor by curving a portion of the first ground conductor such that the portion protrudes toward the signal line in section perpendicular or substantially perpendicular to the signal line.

According to various preferred embodiments of the present invention, in a flexible high-frequency signal line, the risk of a shift of the characteristic impedance from an intended value is diminished or eliminated.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a perspective view of a high-frequency signal line according to a preferred embodiment of the present invention.

FIG. 2 is an exploded view of a dielectric body of the high-frequency signal line of FIG. 1.

FIG. 3 is an exploded view of a line portion of the high-frequency signal line.

FIG. 13 is a sectional view of the high-frequency signal line during the pressure-bonding process.

FIG. 14 is a sectional view of the high-frequency signal line during the pressure-bonding process.

FIG. 15 is a sectional view of a high-frequency signal line according to a first modification of a preferred embodiment of the present invention, cut at a bridge.

FIG. 16 is a sectional view of the high-frequency signal line according to the first modification of a preferred embodiment of the present invention, cut at an opening.

FIG. 20 is a sectional view of the high-frequency signal line according to the second modification of a preferred embodiment of the present invention, cut at a bridge portion.

FIG. 21 is a sectional view of the high-frequency signal line according to the second modification of a preferred embodiment of the present invention, cut at an opening portion.

FIG. 23 is a sectional view of the high-frequency signal line during the pressure-bonding process.

FIG. 31 is a sectional view of a line portion of the high-frequency signal line, cut at an opening.

DETAILED DESCRIPTION OF THE PREFERRED EMBODIMENTS

A high-frequency signal line and a manufacturing method thereof according to preferred embodiments of the present invention are hereinafter described with reference to the drawings.

Figure 4:
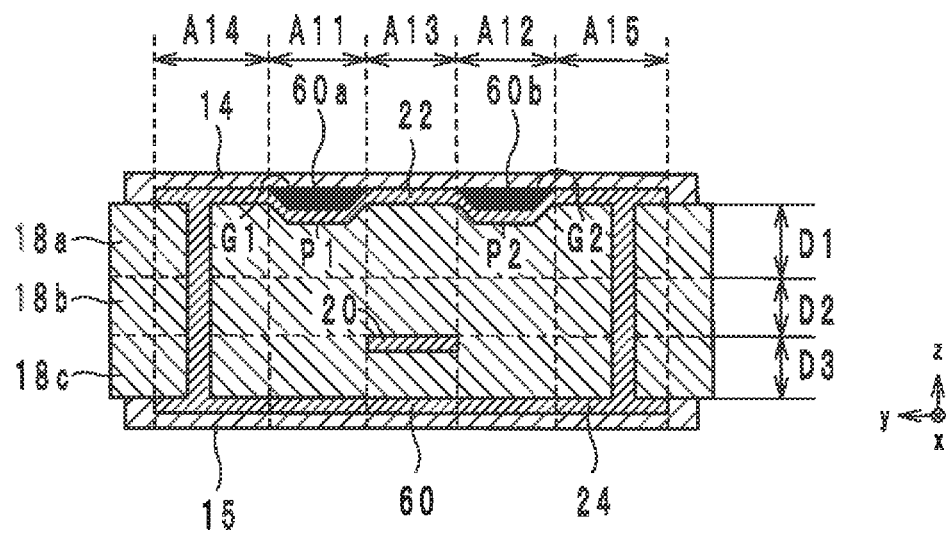
FIG. 4 is a sectional view of the dielectric body along the line A-A indicated in FIG. 2.
Figure 5:
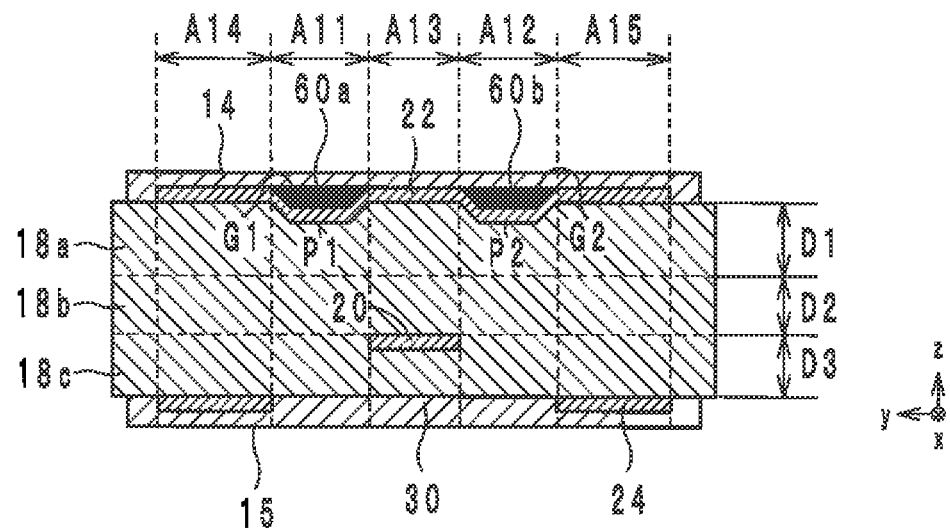
FIG. 5 is a sectional view of the dielectric body along the line B-B indicated in FIG. 2.
Figure 6:
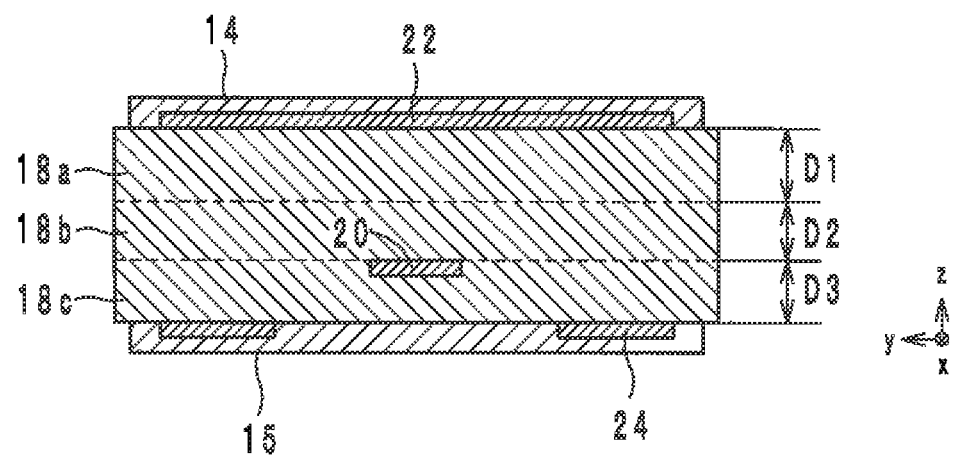
FIG. 6 is a sectional view of the dielectric body along the line C-C indicated in FIG. 2.

A structure of a high-frequency signal line 10 according to a preferred embodiment of the present invention is described. FIG. 1 is a perspective view of the high-frequency signal line 10 according to the present preferred embodiment. FIG. 2 is an exploded view of a dielectric body 12 of the high-frequency signal line 10 of FIG. 1. FIG. 3 is an exploded perspective view of a line portion 12a of the high-frequency signal line 10. FIG. 4 is a sectional view of the dielectric body 12 along the line A-A indicated in FIG. 2. FIG. 5 is a sectional view of the dielectric body along the line B-B indicated in FIG. 2. FIG. 6 is a sectional view of the dielectric body 12 along the line C-C indicated in FIG. 2. The direction of lamination of the high-frequency signal line 10 is defined as a z-direction. The lengthwise direction of the high-frequency signal line 10 is defined as an x-direction. The direction perpendicular or substantially perpendicular to the x-direction and the z-direction is defined as a y-direction.

The high-frequency signal line 10 is a flat cable preferably for use in, for example, an electronic device such as a cell phone or the like to connect two high-frequency circuits. As illustrated in FIGS. 1 through 3, the high-frequency signal line 10 includes a dielectric body 12, external terminals 16a and 16b, a signal line 20, a main ground conductor 22, an auxiliary ground conductor 24, insulators 60a and 60b, via-hole conductors b1 through b4 and B1 through B6, and connectors 100a and 100b.

The dielectric body 12 is, as seen in FIG. 1, a flexible plate-shaped member extending in the x-direction when viewed from the z-direction. The dielectric body 12 includes a line portion 12a, and connecting portions 12b and 12c. As illustrated in FIG. 2, the dielectric body 12 is a laminate of a protective layer 14, dielectric sheets 18a through 18c and a protective layer 15 arranged in this order from a positive side to a negative side in the z-direction. In the following, a main surface of the dielectric body 12 on a positive side in the z-direction is hereinafter referred to as a top surface, and a main surface of the dielectric body 12 on a negative side in the z-direction is hereinafter referred to as a bottom surface.

The line portion 12a, as seen in FIG. 1, extends in the x-direction. The connecting portion 12b is a rectangular or substantially rectangular portion connected to a negative end in the x-direction of the line portion 12a, and the connecting portion 12c is a rectangular or substantially rectangular portion connected to a positive end in the x-direction of the line portion 12a. The widths (sizes in the y-direction) of the connecting portions 12b and 12c are greater than the width (size in the y-direction) of the line portion 12a.

The dielectric sheets 18a and 18b, as seen in FIG. 2, extend in the x-direction and have the same shape as the dielectric body 12 when viewed from the z-direction. The dielectric sheets 18a through 18c are sheets formed of flexible thermoplastic resin such as polyimide, liquid polymer or the like. A main surface of each of the dielectric sheets 18a through 18c on the positive side in the z-direction is hereinafter referred to as an upper surface, and a main surface of each of the dielectric sheets 18a through 18c on the negative side in the z-direction is hereinafter referred to as a lower surface.

As illustrated in FIGS. 4 and 5, the total of the thickness D1 of the dielectric sheet 18a and the thickness D2 of the dielectric sheet 18b is greater than the thickness D3 of the dielectric sheet 18c. After a process of laminating the dielectric sheets 18a through 18c, the total of the thickness D1 and the thickness D2 preferably is, for example, within a range from about 50 µm to about 300 µm. In this preferred embodiment, the total of the thickness D1 and the thickness D2 preferably is about 150 µm, for example. The thickness D1 preferably is about 75 µm, and the thickness D2 preferably is about 75 µm, for example. The thickness D3 preferably is, for example, within a range from about 10 µm to about 100 µm. In this preferred embodiment, the thickness D3 preferably is 50 µm, for example.

The dielectric sheet 18a, as illustrated in FIG. 2, includes a line portion 18a-a, and connecting portions 18a-b and 18a-c. The dielectric sheet 18b, as illustrated in FIG. 2, includes a line portion 18b-a, and connecting portions 18b-b and 18b-c. The dielectric sheet 18c includes a line portion 18c-a, and connecting portions 18c-b and 18c-c. The line portions 18a-a, 18b-a and 18c-a constitute the line portion 12a. The connecting portions 18a-b, 18b-b and 18c-b constitute the connecting portion 12b. The connecting portions 18a-c, 18b-c and 18c-c constitute the connecting portion 12c.

The signal line 20 is, as seen in FIGS. 2 and 3, a linear conductor provided in the dielectric body 12, and the signal line 20 is to transmit a high-frequency signal. In this preferred embodiment, the signal line 20 is a linear conductor provided on the lower surface of the dielectric sheet 18b to extend in the x-direction along the dielectric body 12. The negative end in the x-direction of the signal line 20 is, as seen in FIG. 2, located in the center of the connecting portion 18b-b. The positive end in the x-direction of the signal line 20 is, as seen in FIG. 2, located in the center of the connecting portion 18b-c.

The signal line 20 is preferably formed of a metal material with a low specific resistance including silver or copper, for example. The statement that the signal line 20 is provided on the lower surface of the dielectric sheet 18b means that the signal line 20 is formed preferably by plating the lower surface of the dielectric sheet 18b with a metal foil and by patterning the metal foil or that the signal line 20 is formed preferably by applying a metal foil on the lower surface of the dielectric sheet 18b and by patterning the metal foil. The surface of the signal line 20 is smoothened, and therefore, the surface of the signal line 20 in contact with the dielectric sheet 18b has a greater surface roughness than the surface of the signal line 20 out of contact with the dielectric sheet 18b.

The main ground conductor 22 is, as seen in FIGS. 2 through 6, a continuous conductor layer located farther in the positive z-direction than the signal line 20 and extending in the x-direction. More specifically, the main ground conductor 22 is provided on the upper surface of the dielectric sheet 18a so as to face the signal line 20 via the dielectric sheets 18a and 18b. The main ground conductor 22 does not have openings at positions over the signal line 20. In the following, a main surface of the main ground conductor 22 on the positive side in the z-direction is referred to as an upper surface, and a main surface of the main ground conductor 22 on the negative side in the z-direction is referred to as a lower surface.

The main ground conductor 22 is preferably formed of a metal material with a low specific resistance including silver or copper, for example. The statement that the main ground conductor 22 is provided on the upper surface of the dielectric sheet 18a means that the main ground conductor 22 is formed preferably by plating the upper surface of the dielectric sheet 18a with a metal foil and by patterning the metal foil or that the main ground conductor 22 is formed preferably by applying a metal foil on the upper surface of the dielectric sheet 18a and by patterning the metal foil. The surface of the main ground conductor 22 is smoothened, and therefore, the surface of the main ground conductor 22 in contact with the dielectric layer 18a (the lower surface of the main ground conductor 22) has a greater surface roughness than the surface of the main ground conductor 22 out of contact with the dielectric layer 18a (the upper surface of the main ground conductor 22).

The main ground conductor 22, as illustrated in FIG. 2, includes a line portion 22a, and terminal portions 22b and 22c. The line portion 22a is provided on the upper surface of the line portion 18a-a to extend in the x-direction. The terminal portion 22b is provided on the upper surface of the connecting portion 18a-b and preferably is rectangular or substantially rectangular ring-shaped. The terminal portion 22b is connected to the negative end in the x-direction of the line portion 22a. The terminal portion 22c is provided on the upper surface of the connecting portion 18a-c and preferably is rectangular or substantially rectangular ring-shaped. The terminal portion 22c is connected to the positive end in the x-direction of the line portion 22a.

The auxiliary ground conductor 24 is, as seen in FIG. 2, a conductor layer located farther in the negative z-direction than the signal line 20 and extending in the x-direction. More specifically, the auxiliary ground conductor 24 is provided on the lower surface of the dielectric sheet 18c so as to face the signal line 20 via the dielectric sheet 18c. The auxiliary ground conductor 24 is preferably formed of a metal material with a low specific resistance including silver or copper, for example. The statement that the auxiliary ground conductor 24 is provided on the lower surface of the dielectric sheet 18c means that the auxiliary ground conductor 24 is formed preferably by plating the lower surface of the dielectric sheet 18c with a metal foil and by patterning the metal foil or that the auxiliary ground conductor 24 is formed preferably by applying a metal foil on the lower surface of the dielectric sheet 18c and by patterning the metal foil. The surface of the auxiliary ground conductor 24 is smoothened, and therefore, the surface of the auxiliary ground conductor 24 in contact with the dielectric layer 18c has a greater surface roughness than the surface of the auxiliary ground conductor 24 out of contact with the dielectric layer 18c.

The auxiliary ground conductor 24, as illustrated in FIGS. 2 through 6, includes a line portion 24a, and terminal portions 24b and 24c. The line portion 24a is provided on the lower surface of the line portion 18c-a to extend in the x-direction. The terminal portion 24b is provided on the lower surface of the connecting portion 18c-b and preferably is rectangular or substantially rectangular ring-shaped. The terminal portion 24b is connected to the negative end in the x-direction of the line portion 24a. The terminal portion 24c is provided on the lower surface of the connecting portion 18c-c and is rectangular or substantially rectangular ring-shaped. The terminal portion 24c is connected to the positive end in the x-direction of the line portion 24a.

As seen in FIGS. 2 and 3, the line portion 24a preferably includes rectangular or substantially rectangular openings 30 aligned in the x-direction. Accordingly, the line portion 24a is shaped like a ladder. In the auxiliary ground conductor 24, intervals between the openings 30 are referred to as bridges 60. Each of the bridges 60 extends in the y-direction. When viewed from the z-direction, the openings 30 and the bridges 60 are alternately arranged to be overlapped with the signal line 20. In this preferred embodiment, the signal line 20 extends in the x-direction while crossing the centers of the openings 30 and the bridges 60.

As described above, the main ground conductor 22 does not have openings, while the auxiliary ground conductor 24 includes openings. Therefore, the area of the overlapping portion of the main ground conductor 22 with the signal line 20 is greater than the total area of the overlapping portions of the auxiliary ground conductor 24 with the signal line 20.

As seen in FIG. 2, the external terminal 16a preferably is a rectangular or substantially rectangular conductor provided in the center of the upper surface of the connecting portion 18a-b of the dielectric sheet 18a. Therefore, when viewed from the z-direction, the external terminal 16a extends over the negative end in the x-direction of the signal line 20. As seen in FIG. 2, the external terminal 16b preferably is a rectangular or substantially rectangular conductor provided in the center of the upper surface of the connecting portion 18a-c of the dielectric sheet 18a. Therefore, when viewed from the z-direction, the external terminal 16b is over the positive end in the x-direction of the signal line 20.

The external terminals 16a and 16b are preferably formed of a metal material with a low specific resistance including silver or copper, for example. The external terminals 16a and 16b are preferably plated with Ni/Au. The statement that the external terminals 16a and 16b are provided on the upper surface of the dielectric sheet 18a means that the external terminals 16a and 16b are formed preferably by plating the upper surface of the dielectric sheet 18a with a metal foil and by patterning the metal foil or that the external terminals 16a and 16b are formed preferably by applying a metal foil on the upper surface of the dielectric sheet 18a and by patterning the metal foil. The surfaces of the external terminals 16a and 16b are smoothened, and therefore, the respective surfaces of the external terminals 16a and 16b in contact with the dielectric sheet 18a have a greater surface roughness than the respective surfaces of the external terminals 16a and 16b out of contact with the dielectric sheet 18a.

The external terminals 16a and 16b, the signal line 20, the main ground conductor 22 and the auxiliary ground conductor 24 have a same or substantially a same thickness. The thickness of the external terminals 16a and 16b, the signal line 20, the main ground conductor 22 and the auxiliary ground conductor 24 preferably is, for example, within a range from about 10 μm to about 20 μm.

As described above, the signal line 20 is sandwiched between the main ground conductor 22 and the auxiliary ground conductor 24 from the both sides in the z-direction. Thus, the signal line 20, the main ground conductor 22 and the auxiliary ground conductor 24 define a triplate-type stripline structure. As illustrated in FIGS. 4 and 5, the interval (distance in the z-direction) between the signal line 20 and the main ground conductor 22 is equal or substantially equal to the total of the thickness D1 of the dielectric sheet 18a and the thickness D2 of the dielectric sheet 18b, and preferably is, for example, within a range from about 50 μm to about 300 μm. In this preferred embodiment, the interval between the signal line 20 and the main ground conductor 22 preferably is about 150 μm, for example. The interval (distance in the z-direction) between the signal line and the auxiliary ground conductor 24 is equal or substantially equal to the thickness D3 of the dielectric sheet 18c, and is, for example, within a range from about 10 μm to about 100 μm. In this preferred embodiment, the interval between the signal line 20 and the auxiliary ground conductor 24 preferably is about 50 μm, for example. Thus, the distance in the z-direction between the signal line 20 and the main ground conductor 22 is greater than the distance in the z-direction between the signal line 20 and the auxiliary ground conductor 24.

The via-hole conductors B1 are, as seen in FIG. 2, pierced in the dielectric sheet 18a in the z-direction. The via-hole conductors B1 are located farther in the positive y-direction than the signal line 20 and are aligned in the x-direction at uniform intervals. The via-hole conductors B2 are, as seen in FIG. 2, pierced in the dielectric sheet 18b in the z-direction. The via-hole conductors B2 are located farther in the positive y-direction than the signal line 20 and are aligned in the x-direction at uniform intervals. The via-hole conductors B3 are, as seen in FIG. 2, pierced in the dielectric sheet 18c in the z-direction. The via-hole conductors B3 are located farther in the positive y-direction than the signal line 20 and are aligned in the x-direction at uniform intervals. The via-hole conductors B1 are connected to the respectively adjacent via-hole conductors B2, and the via-hole conductors B2 are connected to the respectively adjacent via-hole conductors B3. Accordingly, each connected set of via-hole conductors B1 through B3 defines and serves as one via-hole conductor. The respective positive ends in the z-direction of the via-hole conductors B1 are connected to the main ground conductor 22. The respective negative ends in the z-direction of the via-hole conductors B3 are connected to the auxiliary ground conductor 24, and more specifically to the respective positive sides in the y-direction of the bridges 60. The via-hole conductors B1 through B3 are formed preferably by filling via holes made in the dielectric sheets 18a through 18c with conductive paste consisting mainly of silver, tin, copper or the like and by solidifying the conductive paste.

The via-hole conductors B4 are, as seen in FIG. 2, pierced in the dielectric sheet 18a in the z-direction. The via-hole conductors B4 are located farther in the negative y-direction than the signal line 20 and are aligned in the x-direction at uniform intervals. The via-hole conductors B5 are, as seen in FIG. 2, pierced in the dielectric sheet 18b in the z-direction. The via-hole conductors B5 are located farther in the negative y-direction than the signal line 20 and are aligned in the x-direction at uniform intervals. The via-hole conductors B6 are, as seen in FIG. 2, pierced in the dielectric sheet 18c in the z-direction. The via-hole conductors B6 are located farther in the negative y-direction than the signal line 20 and are aligned in the x-direction at uniform intervals. The via-hole conductors B4 are connected to the respectively adjacent via-hole conductors B5, and the via-hole conductors B5 are connected to the respectively adjacent via-hole conductors B6. Accordingly, each connected set of via-hole conductors B4 through B6 defines and serves as one via-hole conductor. The respective positive ends in the z-direction of the via-hole conductors B4 are connected to the main ground conductor 22. The respective negative ends in the z-direction of the via-hole conductors B6 are connected to the auxiliary ground conductor 24, and more specifically to the respective negative sides in the y-direction of the bridges 60. The via-hole conductors B4 through B6 are preferably formed by filling via holes made in the dielectric sheets 18a through 18c with conductive paste consisting mainly of silver, tin, copper or the like and by solidifying the conductive paste.

The via-hole conductor b1, as seen in FIG. 2, is pierced in the connecting portion 18a-b of the dielectric sheet 18a in the z-direction. The via-hole conductor b3, as seen in FIG. 2, is pierced in the connecting portion 18b-b of the dielectric sheet 18b in the z-direction. The via-hole conductors b1 and b3 are connected to each other to define and serve as one via-hole conductor. The positive end in the z-direction of the via-hole conductor b1 is connected to the external terminal 16a. The negative end in the z-direction of the via-hole conductor b3 is connected to the negative end in the x-direction of the signal line 20.

The via-hole conductor b2, as seen in FIG. 2, is pierced in the connecting portion 18a-c of the dielectric sheet 18a in the z-direction. The via-hole conductor b4, as seen in FIG. 2, is pierced in the connecting portion 18b-c of the dielectric sheet 18b in the z-direction. The via-hole conductors b2 and b4 are connected to each other to define and serve as one via-hole conductor. The positive end in the z-direction of the via-hole conductor b2 is connected to the external terminal 16b. The negative end in the z-direction of the via-hole conductor b4 is connected to the positive end in the x-direction of the signal line 20. Thus, the signal line 20 is connected between the external terminals 16a and 16b. The via-hole conductors b1 through b4 are formed preferably by filling via holes made in the dielectric sheets 18a and 18b with conductive paste consisting mainly of silver, tin, copper or the like and by solidifying the conductive paste.

The protective layer 14 is an insulating layer provided on the upper surface of the sheet 18a located on the most positive side in the z-direction, and the protective layer 14 covers substantially the upper surface of the dielectric sheet 18a. In other words, the protective layer 14 is located on the positive side in the z-direction of the main ground conductor 22 and covers the main ground conductor 22. The protective layer 14 is preferably formed of, for example, flexible resin such as a resist material.

The protective layer 14, as illustrated in FIG. 2, includes a line portion 14a, and connecting portions 14b and 14c. The line portion 14a covers substantially the entire upper surface of the line portion 18a-a and accordingly covers the line portion 22a of the main ground conductor 22.

The connecting portion 14b is connected to the negative end in the x-direction of the line portion 14a and covers the upper surface of the connecting portion 18a-b. However, the connecting portion 14b includes openings Ha through Hd.

The opening Ha preferably is a rectangular or substantially rectangular opening located in the center of the connecting portion 14b. The external terminal 16a is exposed to outside through the opening Ha. The opening Hb preferably is a rectangular or substantially rectangular opening located farther in the positive y-direction than the opening Ha. The opening Hc preferably is a rectangular or substantially rectangular opening located farther in the negative x-direction than the opening Ha. The opening Hd preferably is a rectangular or substantially rectangular opening located farther in the negative y-direction than the opening Ha. The terminal portion 22b is exposed to outside through the openings Hb through Hd and functions as an external terminal.

The connecting portion 14c is connected to the positive end in the x-direction of the line portion 14a and covers the upper surface of the connecting portion 18a-c. However, the connecting portion 14c includes openings He through Hh. The opening He preferably is a rectangular or substantially rectangular opening located in the center of the connecting portion 14c. The external terminal 16b is exposed to outside through the opening He. The opening Hf preferably is a rectangular or substantially rectangular opening located farther in the positive y-direction than the opening He. The opening Hg preferably is a rectangular or substantially rectangular opening located farther in the positive x-direction than the opening He. The opening Hh preferably is a rectangular or substantially rectangular opening located farther in the negative y-direction than the opening He. The terminal portion 22c is exposed to outside through the openings Hf through Hh and functions as an external terminal.

The protective layer 15 is an insulating layer provided on the lower surface of the dielectric sheet 18c located on the most negative side in the z-direction. The protective layer 15 is located on the negative side in the z-direction of the auxiliary ground conductor 24 and covers substantially the entire lower surface of the dielectric sheet 18c. Accordingly, the protective layer 15 covers the auxiliary ground conductor 24. The protective layer 15 is formed of, for example, flexible resin such as a resist material.

The line portion 12a of the high-frequency signal line 10 includes a section E1 that is not supposed to be bent when used, and sections E2 and E3 that are supposed to be bent when used. In this preferred embodiment, the section E2 is located on the negative side in the x-direction of the section E1, and the section E3 is located on the positive side in the x-direction of the section E1. In order to make the section E1 of the line portion 12a more difficult to bend than the sections E2 and E3 of the line portion 12a, the following arrangement is preferably provided. As seen in FIGS. 4 and 5, which are sectional views of the section E1 cut in a direction perpendicular or substantially perpendicular to the signal line 20 (perpendicular or substantially perpendicular to the x-direction), the main ground conductor 22 is wavy in the section E1. As seen in FIG. 6, which is a sectional view of the section E2 or E3 cut in the direction perpendicular or substantially perpendicular to the signal line 20 (perpendicular or substantially perpendicular to the x-direction), on the other hand, the main ground conductor 22 is not wavy in the sections E2 and E3. The details are as follows.

As indicated in FIGS. 4 and 5, in section perpendicular or substantially perpendicular to the x-direction, the area extending from the signal line 20 in the z-direction (the area over and underneath the signal line 20) is defined as an area A13. As indicated in FIG. 5, in section perpendicular or substantially perpendicular to the x-direction, the area extending from the opening 30 in the z-direction except the area extending from the signal line 20 in the z-direction are defined as A11 and A12. The area A11 is located on the positive side in the y-direction of the area A13, and the area A12 is located on the negative side in the y-direction of the area A13. The areas A11 and A12 extend in the x-direction along the signal line 20. Accordingly, the areas A11 and A12 exist also in FIG. 4 which is a sectional view of the high-frequency signal line 10 cut at a bridge 60, as in FIG. 5 which is a sectional view of the high-frequency signal line 10 cut at an opening 30.

In section perpendicular or substantially perpendicular to the x-direction, the area on the positive side in the y-direction of the area A11 is defined as an area A14, and the area on the negative side in the y-direction of the area A12 is defined as an area A15.

As seen in FIGS. 4 and 5, in the area A11, a groove G1 is provided on the upper surface of the main ground conductor 22. The groove G1 is a strip-shaped (linear) groove extending in the x-direction along the signal line 20 in the area A11 of the section E1. As seen in FIGS. 4 and 5, in the area A11, the lower surface of the main ground conductor 22 includes a protrusion P1 protruding in the negative z-direction. The protrusion P1 is a strip-shaped (linear) protrusion provided on the lower surface of the main ground conductor 22 in the area A11 of the section E1 so as to extend in the x-direction along the signal line 20. Thus, in sectional perpendicular or substantially perpendicular to the x-direction, a part of the main ground conductor 22 is curved so as to protrude in the negative z-direction. Thus, the groove G1 is provided on the upper surface of the main ground conductor 22, and the protrusion P1 is provided on the lower surface of the main ground conductor 22. When viewed from the z-direction, the groove G1 and the protrusion P1 are located farther in the positive y-direction than the signal line 20 and are not overlapped with the signal line 20.

As seen in FIGS. 2 through 5, an insulator 60a is filled in the groove G1 so as to extend in the x-direction along the signal line 20. The insulator 60a is formed of a material that is different from the protective layer 14 and is more rigid than the dielectric sheets 18a through 18c. The insulator 60a is formed of, for example, resin or the like.

As seen in FIGS. 4 and 5, a groove G2 is provided on the upper surface of the main ground conductor 22, in the area A12. The groove G2 is a strip-shaped (linear) groove extending in the x-direction along the signal line 20 in the area A12 of the section E1. As seen in FIGS. 4 and 5, in the area A12, the lower surface of the main ground conductor 22 includes a protrusion P2 protruding in the negative z-direction. The protrusion P2 is a strip-shaped (linear) protrusion provided on the lower surface of the main ground conductor 22 in the area A12 of the section E1 so as to extend in the x-direction along the signal line 20. Thus, in a section perpendicular or substantially perpendicular to the x-direction, a portion of the main ground conductor 22 is curved so as to protrude in the negative z-direction. Thus, the groove G2 is provided on the upper surface of the main ground conductor 22, and the protrusion P2 is provided on the lower surface of the main ground conductor 22. When viewed from the z-direction, the groove G2 and the protrusion P2 are located farther in the negative y-direction than the signal line 20 and are not overlapped with the signal line 20.

As seen in FIGS. 2 through 5, an insulator 60b is filled in the groove G2 so as to extend in the x-direction along the signal line 20. As the insulator 60a, the insulator 60b is formed of a material that is different from the protective layer 14 and is more rigid than the dielectric sheets 18a through 18c. The insulator 60b is formed of, for example, resin or the like.

In the high-frequency signal line 10 having the structure above, the characteristic impedance of the signal line changes cyclically between an impedance value Z1 and an impedance value Z2. More specifically, in areas A1 where the signal line 20 is over the openings 30, relatively small capacitance is created between the signal line 20 and the auxiliary ground conductor 24. Accordingly, the characteristic impedance of the signal line 20 in the areas A1 is a relatively high value Z1.

In areas A2 where the signal line 20 is over the bridges 60, on the other hand, relatively large capacitance is created between the signal line 20 and the auxiliary ground conductor 24. Accordingly, the characteristic impedance of the signal line 20 in the areas A2 is a relatively low value Z2. In this regard, the areas A1 and the areas A2 are arranged alternately in the x-direction, and therefore, the characteristic impedance of the signal line 20 changes cyclically between the value Z1 and the value Z2. The impedance value Z1 preferably is, for example, about 55Ω, and the impedance value Z2 preferably is, for example, about 45Ω. The average characteristic impedance of the signal line 20 as a whole preferably is, for example, about 50Ω.

Figure 7:
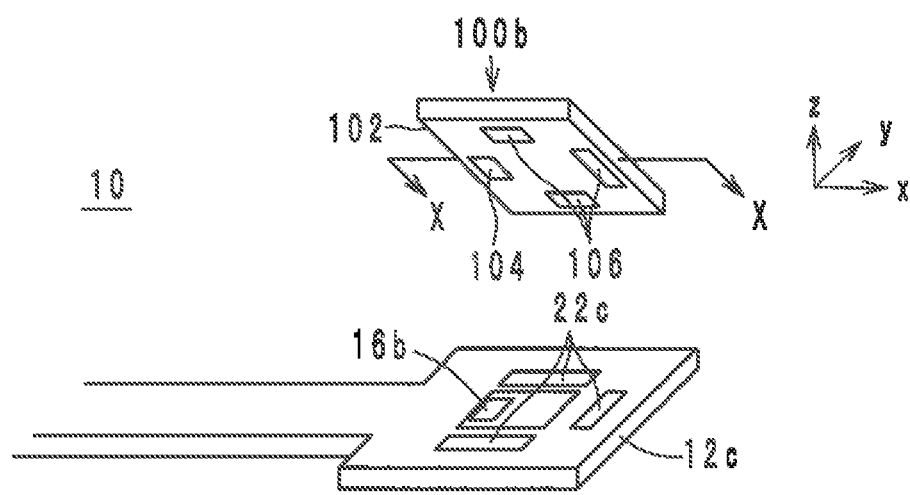
FIG. 7 is a perspective view of a connector of the high-frequency signal line.
Figure 8:
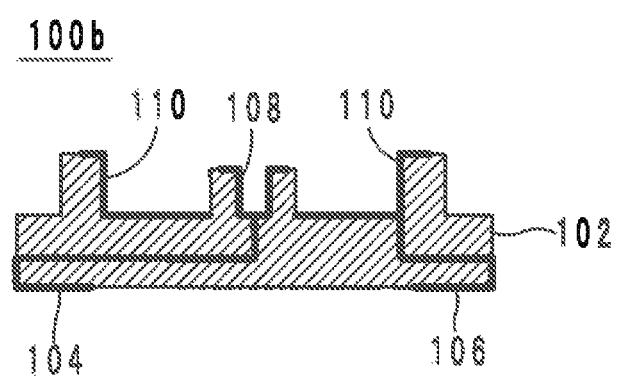
FIG. 8 is a sectional view of the connector of the high-frequency signal line.

The connectors 100a and 100b are, as illustrated in FIG. 1, mounted on the top surfaces of the connecting portions 12b and 12c, respectively. The connectors 100a and 100b have the same structure, and in the following, the structure of the connector 100b is described as an example. FIG. 7 is a perspective view of the connector 100b of the high-frequency signal line 10. FIG. 8 is a sectional view of the connector 100b of the high-frequency signal line 10.

The connector 100b, as illustrated in FIGS. 1, 7 and 8 includes a connector body 102, external terminals 104 and 106, a central conductor 108 and an external conductor 110. The connector body 102 is preferably in the shape of a rectangular or substantially rectangular plate with a cylinder connected thereon, and is formed of an insulating material such as resin.

The external terminal 104 is provided on the surface of the plate-shaped portion of the connector body 102 on the negative side in the z-direction so as to face the external terminal 16b. The external terminal 106 is provided on the surface of the plate-shaped portion of the connector body 102 on the negative side in the z-direction so as to face the terminal conductor 22c exposed through the openings Hf through Hh.

The central conductor 108 is located in the center of the cylindrical portion of the connector body 102 and is connected to the external terminal 104. The central conductor 108 is a signal terminal at which a high-frequency signal is input or output. The external conductor 110 is provided on the inner surface of the cylindrical portion of the connector body 102 and is connected to the external terminal 106. The external conductor 110 is aground terminal that is maintained at a ground potential.

The connector 100b having the structure above is, as illustrated in FIGS. 7 and 8, mounted on the top surface of the connecting portion 12c such that the external terminal 104 is connected to the external terminal 16b and such that the external terminal 106 is connected to the terminal conductor 22c. Thus, the signal line 20 is electrically connected to the central conductor 108, and the main ground conductor 22 and the auxiliary ground conductor 24 are electrically connected to the external conductor 110.

Figure 9:
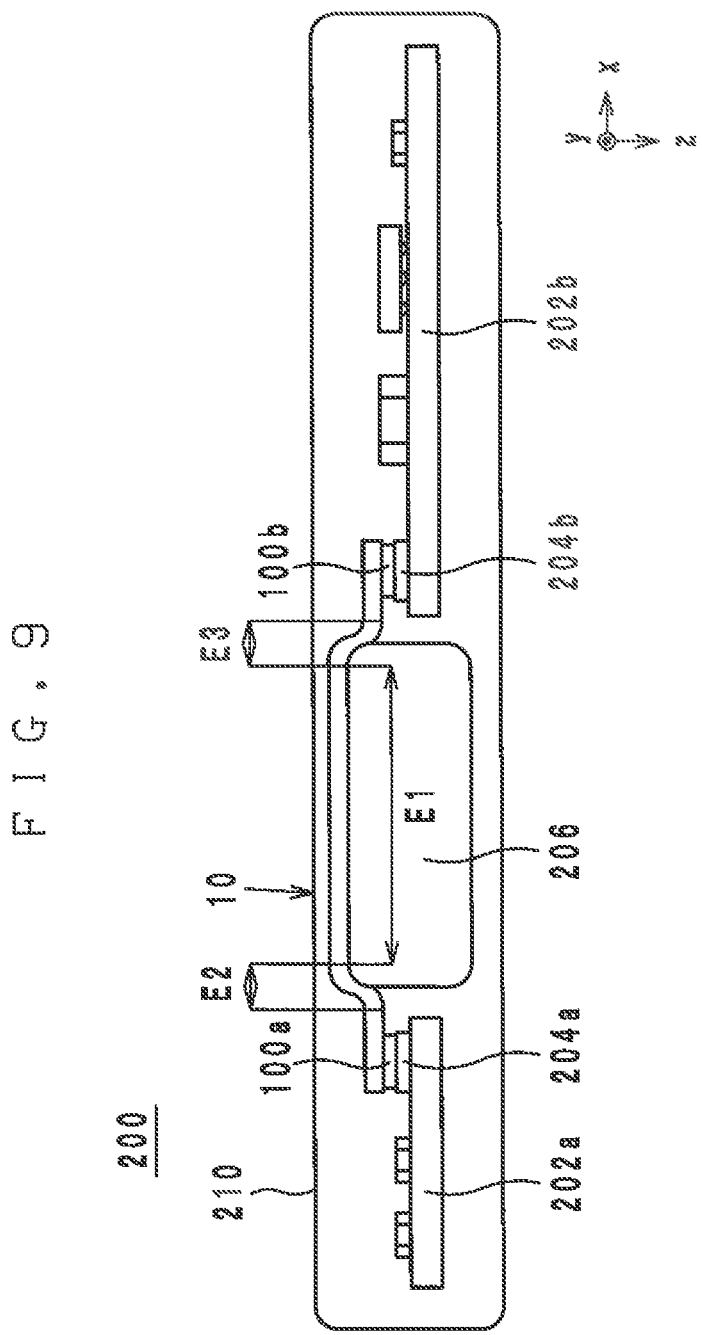
FIG. 9 is a plan view from a y-direction of an electronic device employing the high-frequency signal line.
Figure 10:
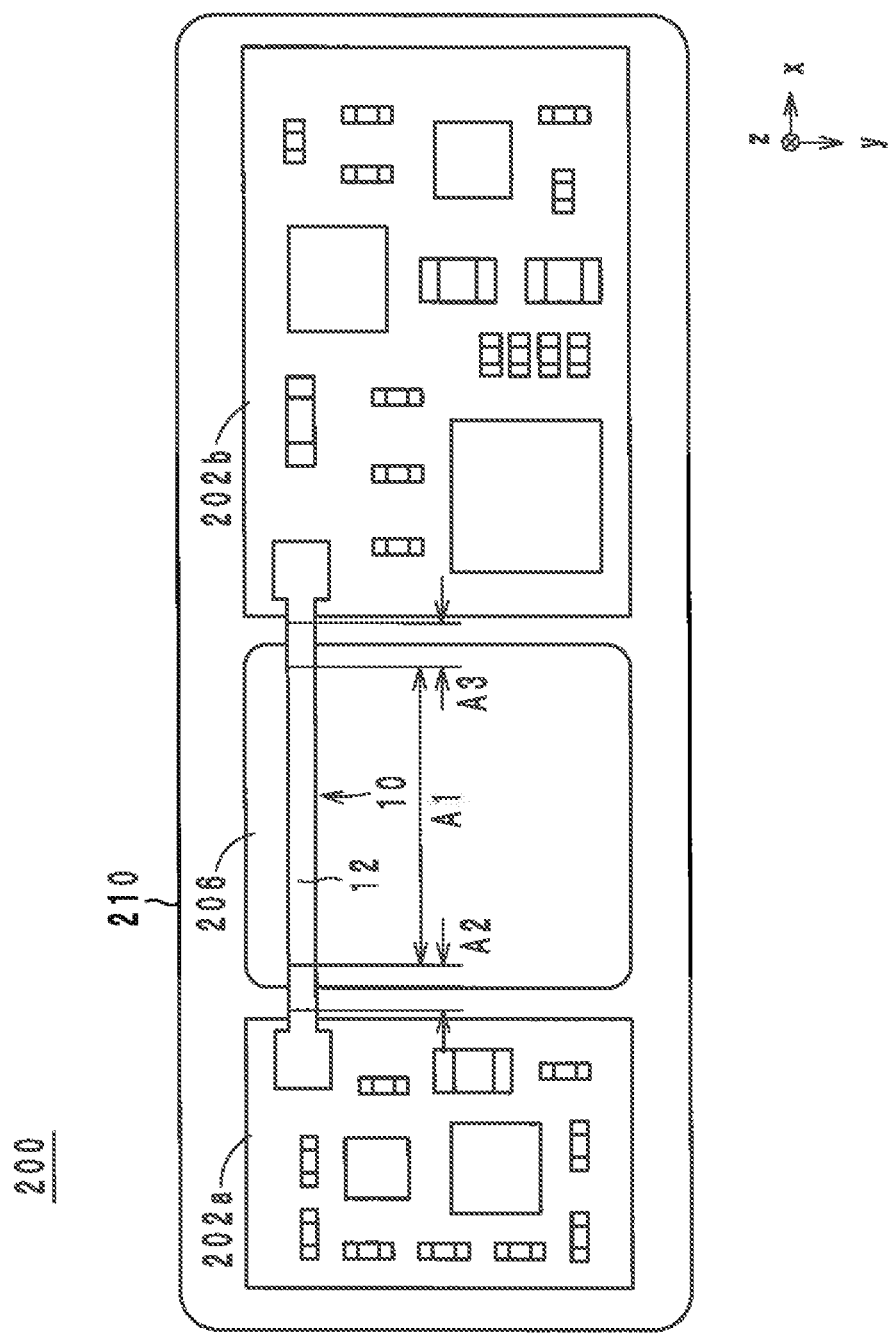
FIG. 10 is a plan view from a z-direction of the electronic device including the high-frequency signal line.

The high-frequency signal line 10 is preferably used in the following way. FIG. 9 is a plan view from the y-direction of an electronic device 200 including the high-frequency signal line 10. FIG. 10 is a plan view from the z-direction of the electronic device 200 including the high-frequency signal line 10. The respective lengths of the sections E1 through E3 indicated in FIGS. 9 and 10 do not correspond to the respective lengths of the sections E1 through E3 indicated in FIGS. 2 and 3. In FIGS. 2 and 3, the section E1 is drawn as shorter for the sake of simplification.

The electronic device 200 includes the high-frequency signal line 10, circuit boards 202a and 202b, receptacles 204a and 204b, a battery pack (metal object) 206, and a case 210.

In the circuit board 202a, for example, a transmitting circuit or a receiving circuit including an antenna is provided. In the circuit board 202b, for example, a feed circuit is provided. The battery pack 206 is, for example, a lithium-ion secondary battery, and the surface of the battery pack 206 is covered by a metal cover. The circuit board 202a, the battery pack 206 and the circuit board 202b are arranged in this order from the negative side to the positive side in the x-direction.

The receptacles 204a and 204b are provided on respective main surfaces of the circuit boards 202a and 202b on the negative side in the z-direction. The connectors 100a and 100b are connected to the receptacles 204a and 204b respectively. Thus, a high-frequency signal with a frequency of, for example, 2 GHz to be transmitted between the circuit boards 202a and 202b is applied to the central conductors 108 of the connectors 100a and 100b through the receptacles 204a and 204b. The respective external conductors 110 of the connectors 100a and 100b are maintained at the ground potential through the circuit boards 202a and 202b, and the receptacles 204a and 204b. In this way, the high-frequency signal line 10 connects the circuit boards 202a and 202b to each other.

In this state, as seen in FIG. 9, the top surface of the section E1 of the dielectric body 12 is in contact with the battery 206, and the dielectric body 12 is fixed to the battery pack 206 by an adhesive. Thus, between the signal line 20 and the battery pack 206, the continuous main ground conductor 22 with no openings is present.

The sections E2 and E3 of the dielectric body 12 are bent along the corners of the battery pack 206.

With reference to the drawings, a non-limiting example of a manufacturing method of the high-frequency signal line 10 is described below. FIGS. 11 through 14 illustrate a pressure-bonding process for manufacturing the high-frequency signal line 10. In the following, a manufacturing method of one high-frequency signal line 10 is described as an example. Practically, however, by laminating large-size dielectric sheets and by cutting the laminate, a plurality of high-frequency signal lines are produced at one time.

First, dielectric sheets, each formed of thermoplastic resin and having a copper foil (metal film) entirely on one main surface, are prepared as the dielectric sheets 18a through 18c. Specifically, copper foils are applied to respective one main surface of the dielectric sheets 18a through 18c. The surfaces of the copper foils are, for example, galvanized for corrosion proof and thereby are smoothened. The dielectric sheets 18a through 18c are formed of liquid polymer. The thicknesses of the copper foils are within a range from about 10 μm to about 20 μm, for example.

Next, the external terminals 16a and 16b, and the main ground conductor 22 as illustrated in FIG. 2 are formed on the upper surface of the dielectric sheet 18a by patterning the copper foil formed on the upper surface of the dielectric sheet 18a. Specifically, resists having identical shapes to the external terminals 16a and 16b, and the main ground conductor 22 are printed on the copper foil on the upper surface of the dielectric sheet 18a. Then, the copper foil is etched, so that the portions of the copper foil not covered by the resists are removed. Thereafter, a cleaning solution is sprayed so as to remove the resists. In this way, the external terminals 16a and 16b, and the main ground conductor 22 as illustrated in FIG. 2 are formed on the upper surface of the dielectric sheet 18a by photolithography.

Next, the signal line 20 as illustrated in FIG. 2 is formed on the lower surface of the dielectric sheet 18b. Further, the auxiliary ground conductor 24 as illustrated in FIG. 2 is formed on the lower surface of the dielectric sheet 18c. The process for forming the signal line 20 and the process for forming the auxiliary ground conductor 24 are the same as the process for forming the external terminals 16a and 16b, and the main ground conductor 22, and descriptions of the processes are omitted here.

Next, the dielectric sheets 18a through 18c are exposed to laser beams such that through holes are made in the dielectric sheets 18a through 18c at the positions of the via-hole conductors b1 through b4 and B1 through B6. Thereafter, conductive paste is filled in the through holes, and thus, the via-hole conductors b1 through b4 and B1 through B6 are formed.

Figure 11:
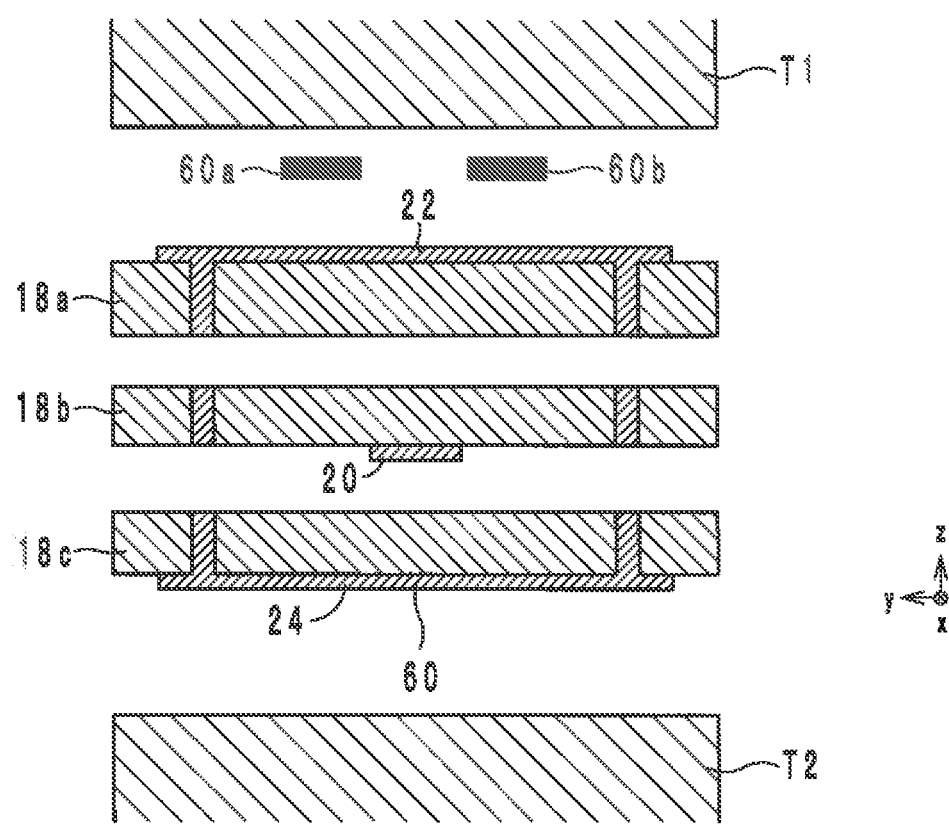
FIG. 11 is a sectional view of the high-frequency signal line during a pressure-bonding process.
Figure 12:
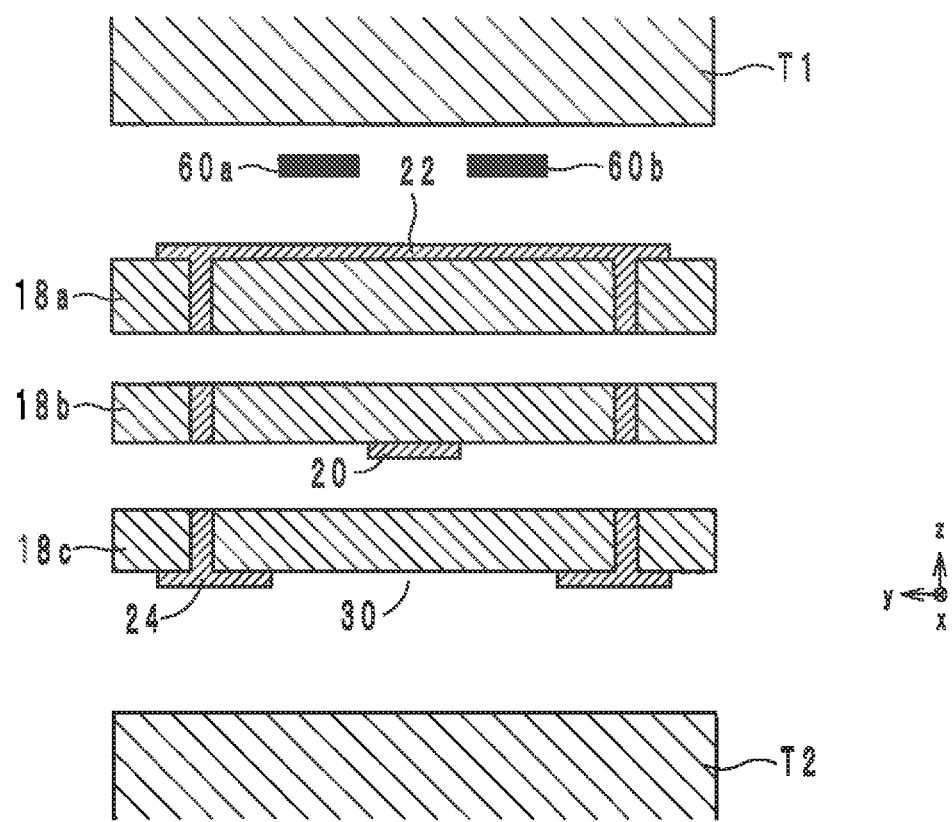
FIG. 12 is a sectional view of the high-frequency signal line during the pressure-bonding process.

Next, as illustrated in FIGS. 11 and 12, the insulators 60a and 60b are placed on the upper surface of the dielectric sheet 18a in the areas A11 and A12 of the section E1. Then, the dielectric sheets 18a through 18c laminated in this order from the positive side to the negative side in the z-direction such that the signal line 20 faces the main ground conductor 22 and the auxiliary ground conductor 24.

Next, as illustrated in FIGS. 13 and 14, the laminate of the dielectric sheets 18a through 18c with the insulators 60a and 60b placed on the main ground conductor 22 is sandwiched between pressure-bonding tools T1 and T2 from the both sides in the z-direction, and thus, the laminate of the dielectric sheets 18a through 18c undergoes a pressing/heating treatment. During the treatment, the insulators 60a and 60b are pressed upon the upper surface of the main ground conductor 22 by the pressure-bonding tool T1 and are dug into the main ground conductor 22. Consequently, the main ground conductor 22 is dented by the insulators 60a and 60b, and in section perpendicular or substantially perpendicular to the x-direction, the main ground conductor 22 becomes wavy. Thus, in the process of forming the dielectric body 12, the main ground conductor 22 is partly curved so as to have portions protruding in the negative z-direction in section perpendicular or substantially perpendicular to the x-direction, and thus, the strip-shaped (linear) grooves G1 and G2 and the protrusions P1 and P2 extending along the signal line 20 are formed on the main ground conductor 22.

Next, resin (resist) paste is applied to the upper surface of the dielectric sheet 18a as illustrated in FIG. 2 by screen printing. Thus, the protective layer 14 covering the upper surface of the main ground conductor 22 is formed on the upper surface of the dielectric sheet 18a.

Next, resin (resist) paste is applied to the lower surface of the dielectric sheet 18c as illustrated in FIG. 2 by screen printing. Thus, the protective layer 15 covering the lower surface of the auxiliary ground conductor 24 is formed on the lower surface of the dielectric sheet 18c. Neither protrusions nor grooves are formed on the lower surface of the protective layer 15. In this way, the laminate body 12 is formed.

Lastly, the connector 100a is mounted on the connecting portion 12b and soldered to the external terminal 16a and the terminal conductor 22b, and the connector 100b is mounted on the connecting portion 12c and soldered to the external terminal 16b and the terminal conductor 22c. Through the process above, the high-frequency signal line 10 as illustrated in FIG. 1 is obtained.

In the flexible high-frequency signal line 10 having the structure above, the characteristic impedance is prevented from shifting from a designed value. More specifically, in the high-frequency signal line 10, as illustrated in FIGS. 4 and 5, in section perpendicular or substantially perpendicular to the x-direction, the main ground conductor 22 is curved such that the portions of the main ground conductor 22 in the areas A11 and A12 of the section E1 protrude in the negative z-direction. Accordingly, in section perpendicular or substantially perpendicular to the x-direction, the main ground conductor 22 is wavy in the section E1. By virtue of this arrangement, the second moment of area in the y-direction of the portion of the main ground conductor 22 in the section E1 is greater than those of the portions of the main ground conductor 22 in the sections E2 and E3. Consequently, the section E1 of the high-frequency signal line 10 is less likely to bend than the sections E2 and E3 of the high-frequency signal line 10. Thus, the section E1 of the high-frequency signal line 10 is prevented from bending, and accordingly, the characteristic impedance of the high-frequency signal line 10 in the section E1 is prevented from shifting from a designed value.

In the high-frequency signal line 10, the insulators 60a and 60b are provided in the section E1. Also by virtue of this arrangement, the section E1 of the high-frequency signal line 10 is less likely to bend, and the characteristic impedance of the high-frequency signal line 10 in the section E1 is prevented from shifting from a designed value.

Further, since the section E1 of the high-frequency signal line 10 is less likely to bend, the tensile force applied to the portion of the signal line 20 in the section E1 is small. Consequently, breakage of the signal line 20 is significantly reduced or prevented.

It is possible to make the high-frequency signal line 10 thinner. More specifically, when the high-frequency signal line 10 is viewed from the z-direction, in the areas A1, the signal line 20 is not over the auxiliary ground conductor 24. Accordingly, little capacitance is created between the signal line 20 and the auxiliary ground conductor 24. Therefore, even a reduction in the distance between the signal line 20 and the auxiliary ground conductor 24 will not cause a significant increase in the capacitance between the signal line 20 and the auxiliary ground conductor 24 and will not result in a significant shift of the characteristic impedance of the signal line 20 from a designed value (for example, about 50Ω). Thus, it is possible to make the high-frequency signal line 10 thinner while maintaining the characteristic impedance of the signal line 20 at a designed value.

Even when the high-frequency signal line 10 is fixed to a metal object such as the battery pack 206, a change in the characteristic impedance of the signal line 20 is prevented. More specifically, the high-frequency signal line 10 is fixed to the battery pack 206 such that the continuous main ground conductor 22 is located between the signal line 20 and the battery pack 206. Therefore, there is no risk that the signal line 20 and the battery pack 206 face each other via openings, and capacitance is prevented from being generated between the signal line 20 and the battery pack 206. Accordingly, it is prevented that the characteristic impedance of the signal line 20 is reduced due to the fixation of the high-frequency signal line 10 to the battery pack 206.

Also, the high-frequency signal line 10 has a low insertion loss. More specifically, when a current flows in the signal line 20, lines of electric force occur between the main ground conductor 22 and the signal line 20. According to the lines of electric force, the smaller the distance between the main ground conductor 22 and the signal line 20 is, the higher the current density is. Accordingly, a current flows only in a narrow portion of the main ground conductor 22, and the main ground conductor 22 carries little electricity.

When the high-frequency signal line 10 is viewed from the z-direction, as illustrated in FIG. 5, the protrusions P1 and P2 are provided on the both sides in the y-direction of the signal line 20. Thus, the portion of the main ground conductor 22 which is at the same distance from the signal line 20 is widened. Therefore, an electric current flows dispersedly in a wide portion of the main ground conductor 22, which facilitates a current flow in the signal line 20. Thus, the insertion loss of the high-frequency signal line 10 is reduced.

First Modification

A high-frequency signal line 10a according to a first modification of a preferred embodiment of the present invention is hereinafter described with reference to the drawings. FIG. 15 is a sectional view of the line portion 12a of the high-frequency signal line 10a cut at a bridge 60. FIG. 16 is a sectional view of the line portion 12a of the high-frequency signal line 10a cut at an opening 30. The appearance of the high-frequency signal line 10a is as illustrated in FIG. 1.

The high-frequency signal line 10a is different from the high-frequency signal line 10 in that instead of the protective layer 14, a dielectric sheet 18d is placed on the positive side in the z-direction of the dielectric sheet 18a. Accordingly, the main ground conductor 22 is covered by the dielectric sheet 18d.

Next, a non-limiting example of a manufacturing method of the high-frequency signal line 10a is described. The following description of the manufacturing method of the high-frequency signal line 10a is focused on differences from the manufacturing method of the high-frequency signal line 10, and descriptions of the same points as the manufacturing method of the high-frequency signal line 10 are omitted.

Figure 17:
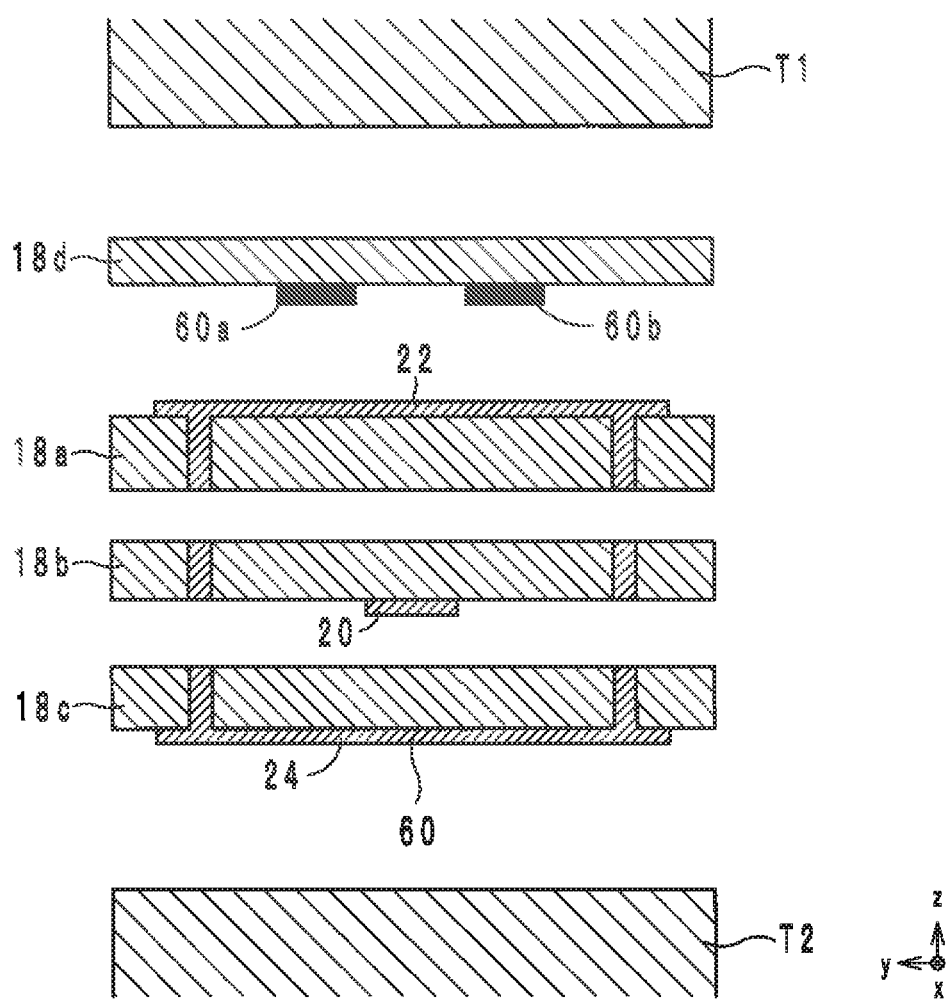
FIG. 17 is a sectional view of the high-frequency signal line during a pressure-bonding process.
Figure 18:
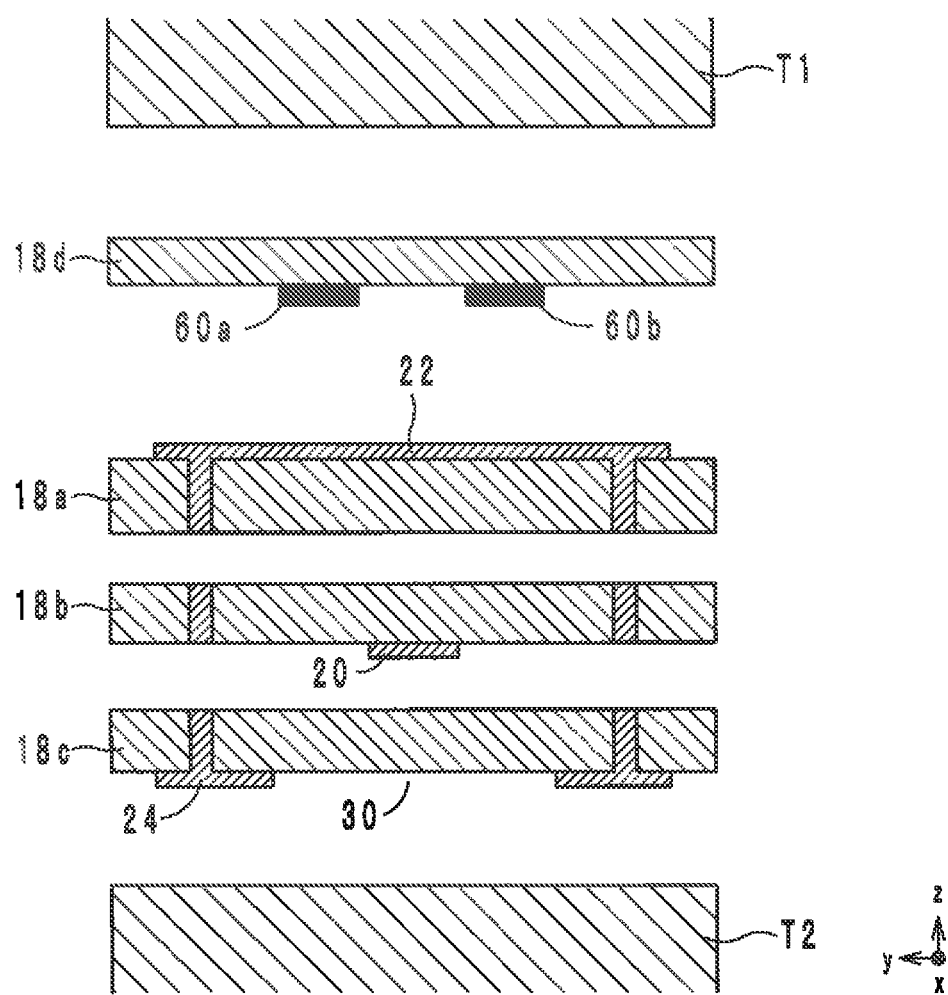
FIG. 18 is a sectional view of the high-frequency signal line during the pressure-bonding process.

As illustrated in FIGS. 17 and 18, the insulators 60a and 60b are applied to the lower surface of the dielectric sheet 18d. Then, the dielectric sheets 18d and 18a through 18c are laminated in this order from the positive side to the negative side in the z-direction such that the signal line 20 faces the main ground conductor 22 and the auxiliary ground conductor 24.

The laminate of the dielectric sheets 18d and 18a through 18c is sandwiched between pressure-bonding tools T1 and T2 from the both sides in the z-direction, and thus, the laminate of the dielectric sheets 18a through 18c undergoes a pressing/heating treatment. During the treatment, the insulators 60a and 60b are pressed upon the upper surface of the main ground conductor 22 by the pressing force transmitted from the pressure-bonding tool T1 via the dielectric sheet 18d and are dug into the main ground conductor 22. Consequently, the main ground conductor 22 is dented by the insulators 60a and 60b, and in section perpendicular or substantially perpendicular to the x-direction, the main ground conductor 22 becomes wavy.

In the flexible high-frequency signal line 10a having the structure above, as in the high-frequency signal line 10, the characteristic impedance is prevented from shifting from a designed value, and the above-described method allows production of the high-frequency signal line 10a.

Second Preferred Embodiment

Figure 19:
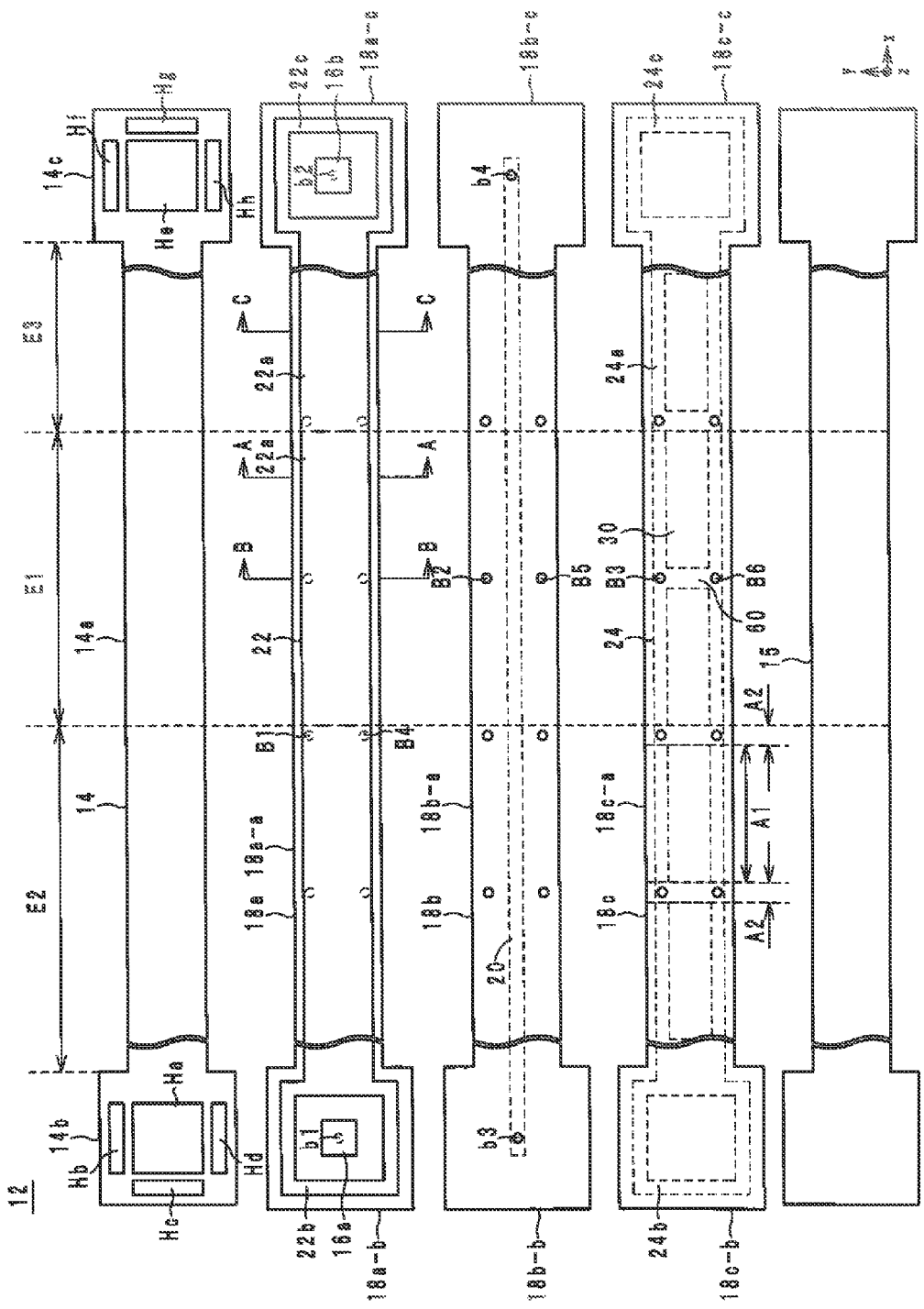
FIG. 19 is an exploded view of a dielectric body of a high-frequency signal line according to a second modification of a preferred embodiment of the present invention.

A high-frequency signal line 10b according to a second modification of a preferred embodiment of the present invention is hereinafter described with reference to the drawings. FIG. 19 is an exploded view of the dielectric body 12 of the high-frequency signal line 10b according to the second modification. FIG. 20 is a sectional view of the line portion 12a of the high-frequency signal line 10b cut at a bridge 60. FIG. 21 is a sectional view of the line portion 12a of the high-frequency signal line 10b cut at an opening 30. The appearance of the high-frequency signal line 10b is as illustrated in FIG. 1.

As seen in FIGS. 19 through 21, the high-frequency signal line 10b is different from the high-frequency signal line 10a in that the insulators 60a and 60b are not provided. In the high-frequency signal line 10b, as seen in FIGS. 20 and 21, the protective layer 14 is provided inside the grooves G1 and G2.

Next, a non-limiting example of a manufacturing method of the high-frequency signal line 10b is described. The following description of the manufacturing method of the high-frequency signal line 10b is focused on differences from the manufacturing method of the high-frequency signal line 10, and descriptions of the same points as the manufacturing method of the high-frequency signal line 10 are omitted. FIGS. 22 through 25 are sectional views illustrating a pressure-bonding process for manufacturing the high-frequency signal line 10b.

Figure 22:
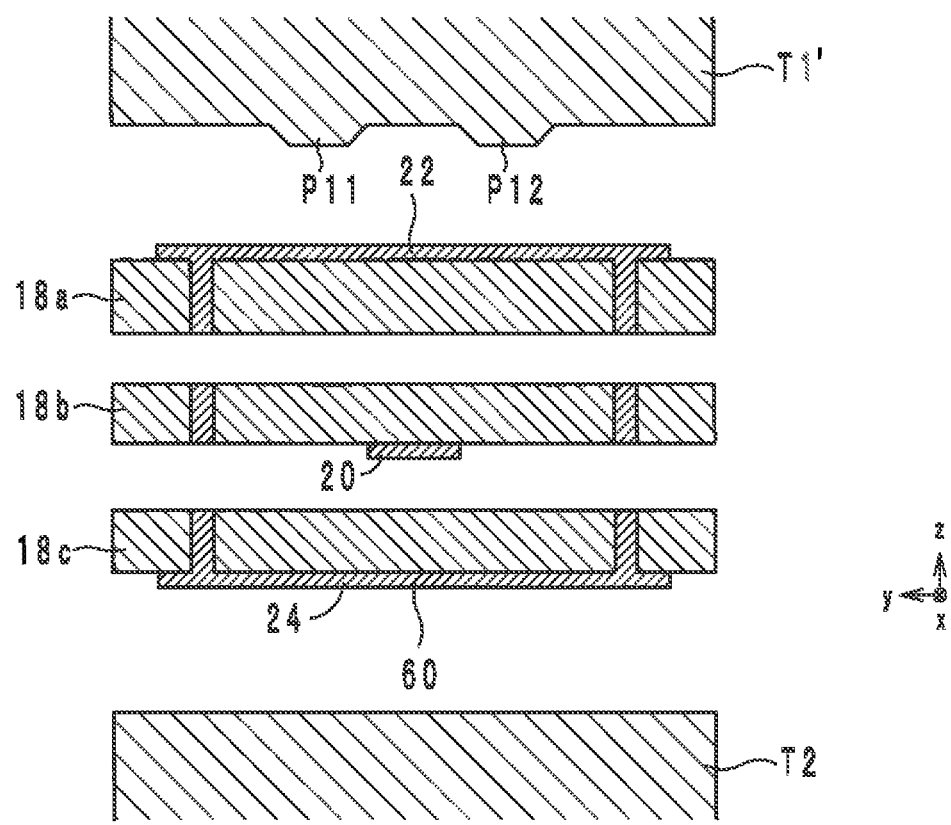
FIG. 22 is a sectional view of the high-frequency signal line during a pressure-bonding process.

As illustrated in FIGS. 22 and 23, the dielectric sheets 18a through 18c are laminated in this order from the positive side to the negative side in the z-direction such that the signal line 20 faces the main ground conductor 22 and the auxiliary ground conductor 24.

Figure 24:
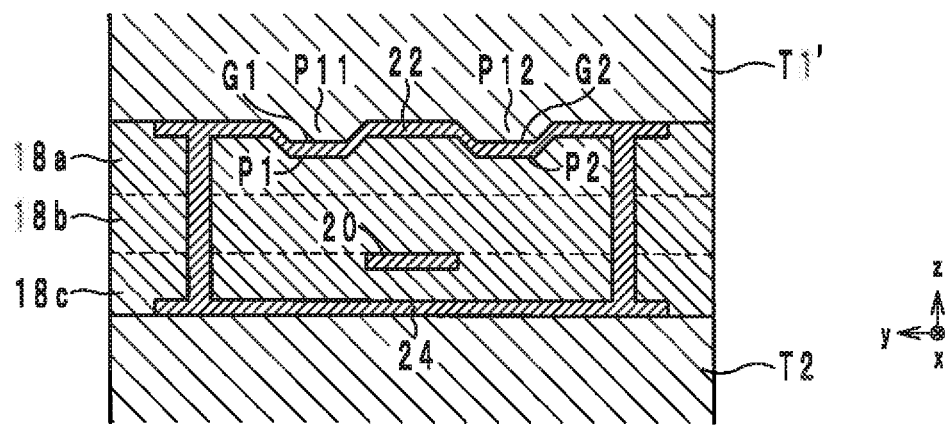
FIG. 24 is a sectional view of the high-frequency signal line during the pressure-bonding process.
Figure 25:
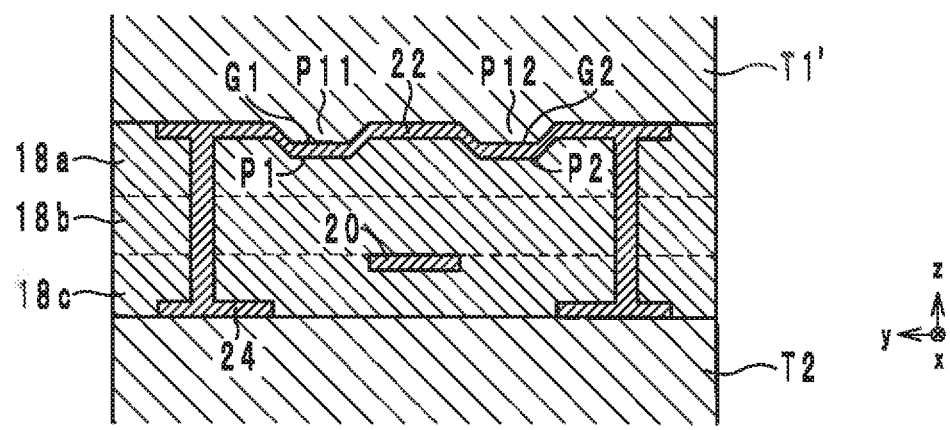
FIG. 25 is a sectional view of the high-frequency signal line during the pressure-bonding process.

Next, as illustrated in FIGS. 24 and 25, the laminate of the dielectric sheets 18a through 18c is sandwiched between pressure-bonding tools T1' and T2 from the both sides in the z-direction, and thus, the laminate of the dielectric sheets 18a through 18c undergoes a pressing/heating treatment. The pressure-bonding tools T1' and T2 are described below.

The pressure-bonding tool T1' is, as illustrated in FIGS. 24 and 25, to come into contact with the upper surface of the dielectric sheet 18a and the upper surface of the main ground conductor 22. A contact surface of the pressure-bonding tool T1' to come into contact with the upper surface of the dielectric sheet 18a and the upper surface of the main ground conductor 22 is lumpy. More specifically, on the contact surface of the pressure-bonding tool T1', protrusions P11 and P12 protruding in the negative z-direction and extending in the x-direction are formed. The position of the protrusion P11 corresponds to the position where the groove G1 is formed (that is, corresponds to the area A11 in the section E1), and the position of the protrusion P12 corresponds to the position where the groove G2 is formed (that is, corresponds to the area A12 in the section E1). The pressure-bonding tool T2 is, as illustrated in FIGS. 24 and 25, to come into contact with the lower surface of the dielectric sheet 18c and the lower surface of the auxiliary ground conductor 24. A contact surface of the pressure-bonding tool T2 to come into contact with the upper surface of the dielectric sheet 18a and the upper surface of the main ground conductor 22 is flat.

The pressure-bonding tools T1' and T2 have built-in heaters. While the laminate of the dielectric sheets 18a through 18c is undergoing the heating/pressing treatment carried out by the pressure-bonding tools T1' and T2, the dielectric sheets 18a through 18c are softened. Thus, as seen in FIGS. 13 and 14, the dielectric sheets 18a through 18c are joined together. Further, the protrusions P11 and P12 are dug into the main ground conductor 22. Thus, in section perpendicular or substantially perpendicular to the x-direction, the main ground conductor 22 becomes wavy. Thus, in the manufacturing method of the high-frequency signal line 10b, during a process of forming the laminate body 12, the main ground conductor 22 is embossed, and thereby, the strip-shaped (linear) grooves G1 and G2 and protrusions P1 and P2 are formed.

In the flexible high-frequency signal line 10b having the structure above, as in the high-frequency signal line 10, the characteristic impedance is prevented from shifting from a designed value, and the above-described method allows production of the high-frequency signal line 10b.

Third Modification

Figure 26:
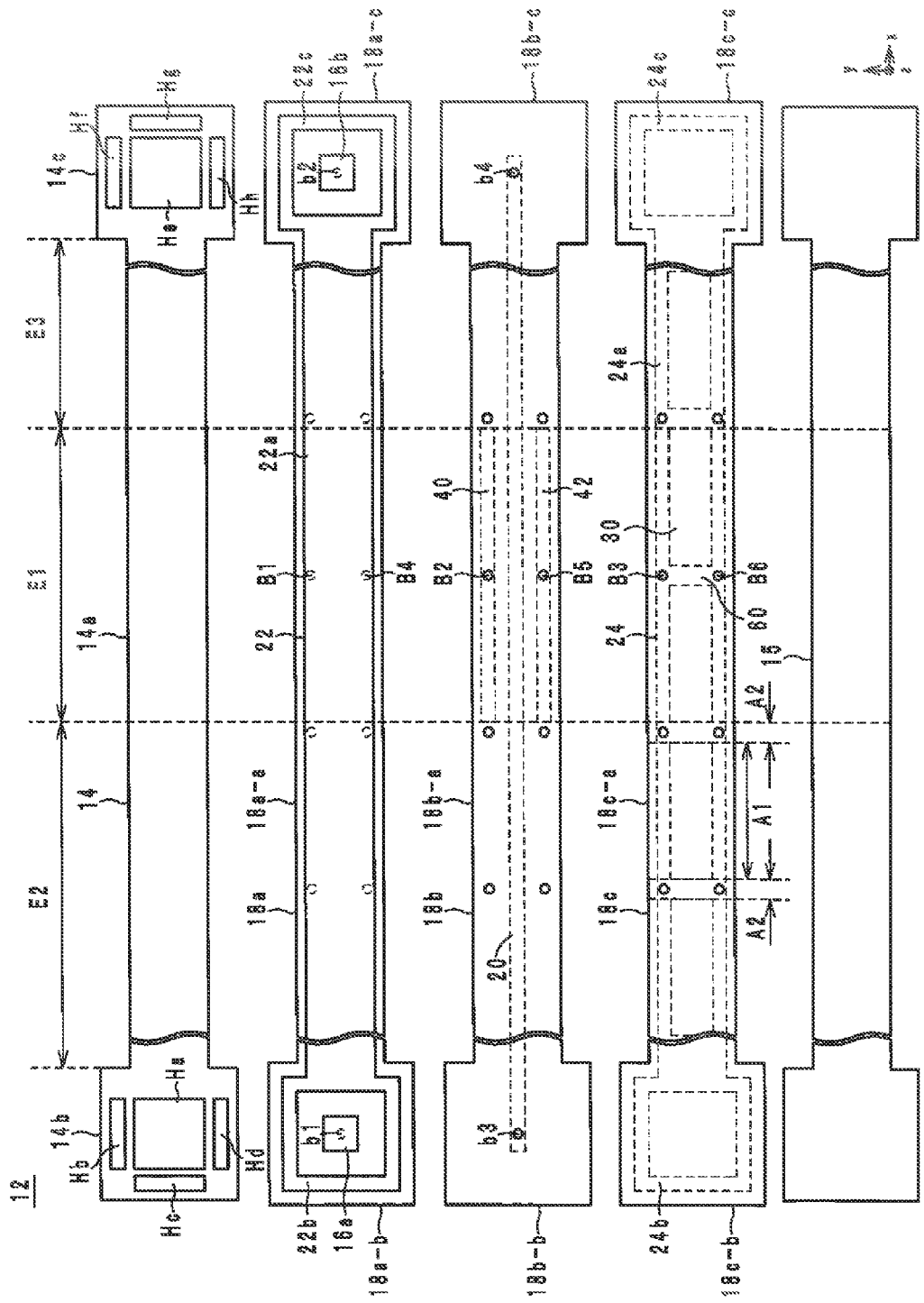
FIG. 26 is an exploded view of a high-frequency signal line according to a third modification of a preferred embodiment of the present invention.

A high-frequency signal line 10c according to a third preferred embodiment of a preferred embodiment of the present invention and a manufacturing method thereof are hereinafter described with reference to the drawings. FIG. 26 is an exploded view of the high-frequency signal line 10c according to the third modification. The appearance of the high-frequency signal line 10c is as illustrated in FIG. 1.

As seen in FIG. 26, the high-frequency signal line 10c is different from the high-frequency signal line 10b in that reinforcement ground conductors 40 and 42 are further provided. More specifically, the reinforcement ground conductor 40 is provided on the lower surface of the dielectric sheet 18b in the section E1 so as to extend in the x-direction. When viewed from the z-direction, the reinforcement ground conductor 40 is located farther in the positive y-direction than the signal line 20 and overlaps with the auxiliary ground conductor 24 while not lapping over the openings 30 and the bridges 60. Accordingly, the reinforcement ground conductor 40 is located outside the area A11. The via-hole conductors B2 and B3 are connected to the reinforcement ground conductor 40.

The reinforcement ground conductor 42 is provided on the lower surface of the dielectric sheet 18b in the section E1 so as to extend in the x-direction. When viewed from the z-direction, the reinforcement ground conductor 42 is located farther in the negative y-direction than the signal line 20 and overlaps with the auxiliary ground conductor 24 while not lapping over the openings 30 and the bridges 60. Accordingly, the reinforcement ground conductor 42 is located outside the area A12. The via-hole conductors B5 and B6 are connected to the reinforcement ground conductor 42.

In the structure, in section perpendicular or substantially perpendicular to the x-direction, in the area A13, there are three conductive layers, namely, the signal line 20, the main ground conductor 22 and the auxiliary ground conductor 24. In section perpendicular or substantially perpendicular to the x-direction, in the areas A14 and A15, there are three conductive layers, namely, the main ground conductor 22, the auxiliary ground conductor 24 and the reinforcement ground conductor 40. In section perpendicular or substantially perpendicular to the x-direction, in the areas A11 and A12, however, there are only two conductive layers, namely, the main ground conductor 22 and the auxiliary ground conductor 24. Thus, in section perpendicular or substantially perpendicular to the x-direction, the proportion of conductors in the area A11 including the strip-shaped (linear) groove G1 and protrusion P1 and the proportion of the conductors in the area A12 including the strip-shaped (linear) groove G2 and protrusion P2 are lower than the proportion of the conductors in any of the areas A13 through A15 including neither of the strip-shaped (linear) protrusions P1 and P2.

Next, a non-limiting example of a manufacturing method of the high-frequency signal line 10c having the structure above is described with reference to the drawings. FIGS. 27 through 30 are sectional views illustrating a pressure-bonding process for manufacturing the high-frequency signal line 10c. In the following, a manufacturing method of one high-frequency signal line 10c is described as an example. Practically, however, by laminating large-size dielectric sheets and by cutting the laminate, a plurality of high-frequency signal lines 10c are produced at one time.

The pressure-bonding process in the manufacturing method of the high-frequency signal line 10c is different from the pressure-bonding process in the manufacturing method of the high-frequency signal line 10. Therefore, the pressure-bonding process is described below.

Figure 27:
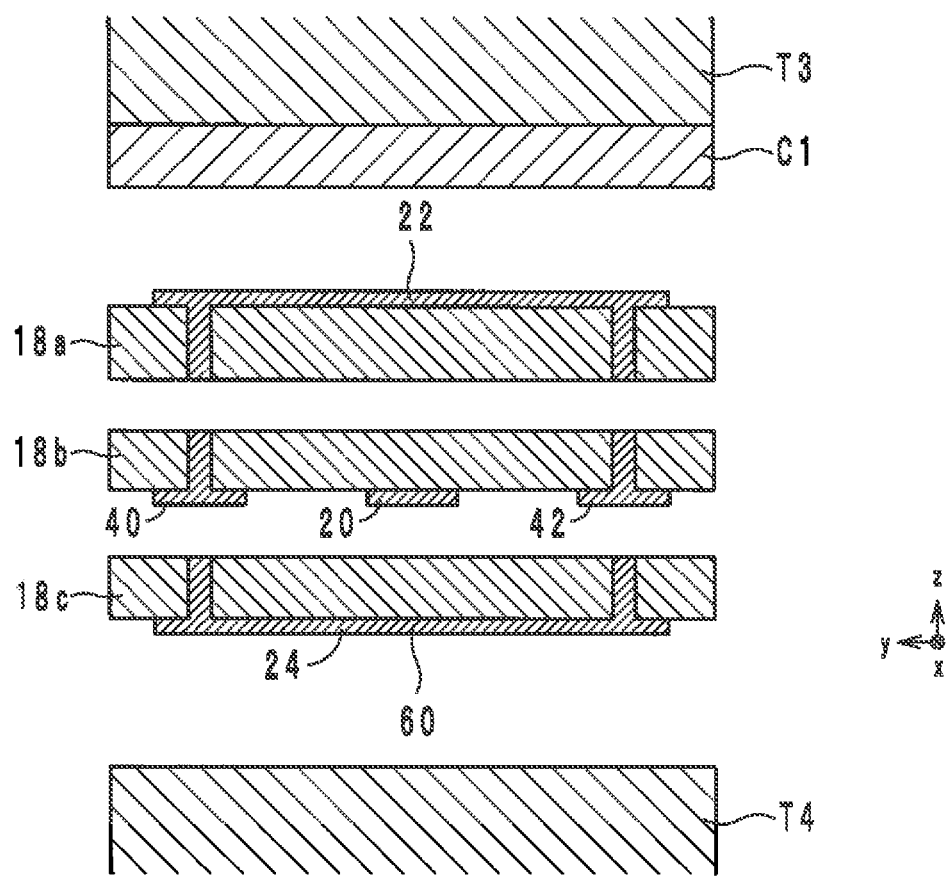
FIG. 27 is a sectional view of the high-frequency signal line during a pressure-bonding process.
Figure 28:
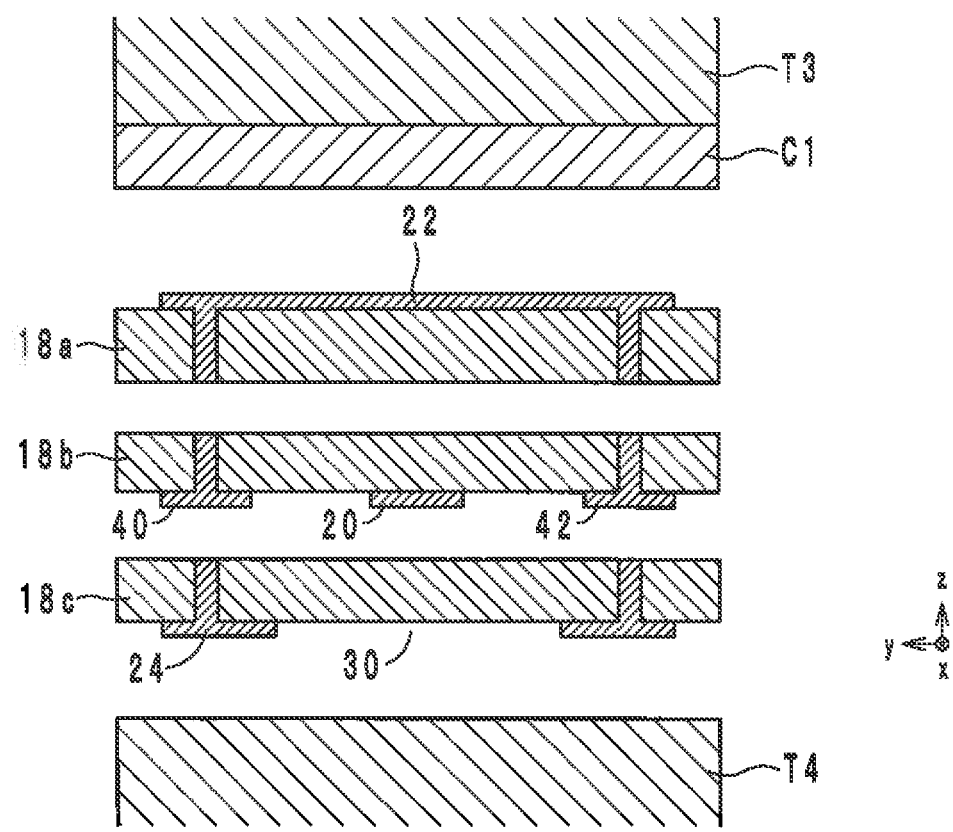
FIG. 28 is a sectional view of the high-frequency signal line during the pressure-bonding process.

First, as illustrated in FIGS. 27 and 28, the dielectric sheets 18a through 18c are laminated in this order from the positive side to the negative side in the z-direction such that the signal line 20 faces the main ground conductor 22 and the auxiliary ground conductor 24.

Figure 29:
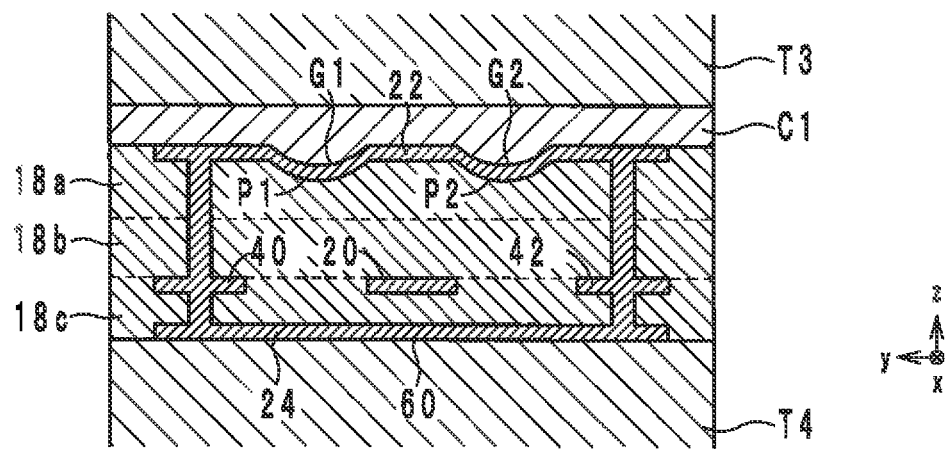
FIG. 29 is a sectional view of the high-frequency signal line during the pressure-bonding process.
Figure 30:
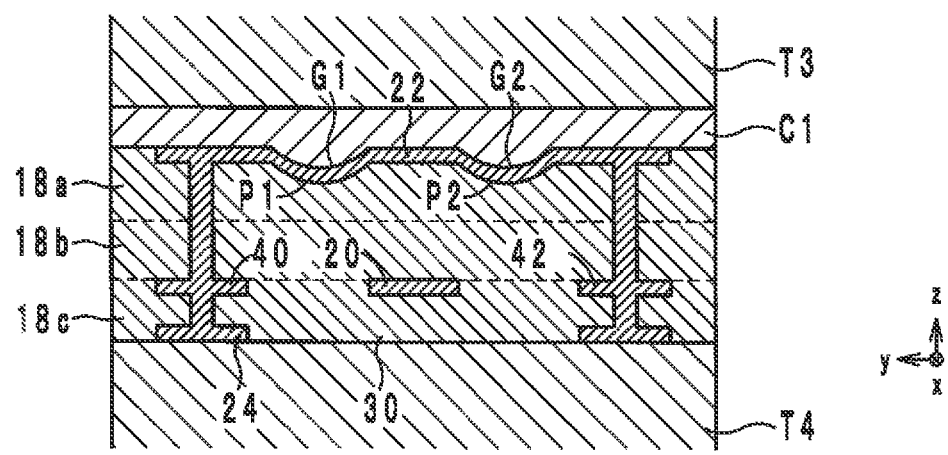
FIG. 30 is a sectional view of the high-frequency signal line during the pressure-bonding process.

Next, as illustrated in FIGS. 29 and 30, the laminate of the dielectric sheets 18a through 18c is sandwiched between pressure-bonding tools T3 and T4 via a cushion member C1 from the both sides in the z-direction, and thus, the laminate of the dielectric sheets 18a through 18c undergoes a pressing/heating treatment. The pressure-bonding tools T3 and T4 are described below.

The pressure-bonding tool T3 is to press the upper surface of the dielectric sheet 18a and the upper surface of the main ground conductor 22 via the cushion member C1. A contact surface of the pressure-bonding tool T3 to come into contact with the cushion member C1 is flat. The cushion member C1 is a sheet of an elastic material such as rubber. The pressure-bonding tool T4 is to press the lower surface of the dielectric sheet 18c and the auxiliary ground conductor 24. A contact surface of the pressure-bonding tool T4 to come into contact with the lower surface of the dielectric sheet 18c and the auxiliary ground conductor 24 is flat. The pressure-bonding tools T3 and T4 have built-in heaters.

While the laminate of the dielectric sheets 18a through 18c is undergoing the heating/pressing treatment carried out by the pressure-bonding tools T3 and T4 and the cushion member C1, the dielectric sheets 18a through 18c are softened. In section perpendicular or substantially perpendicular to the x-direction, the proportion of the conductors in the area A11 where the strip-shaped (linear) groove G1 and protrusions P1 are to be formed and the proportion of the conductors in the area A12 where the strip-shaped (linear) groove G2 and protrusion P2 are to be formed are lower than the proportion of the conductors in any of the areas A13 through A15 where neither of the strip-shaped (linear) protrusions P1 and P2 is to be formed. The conductors are less deformable than the dielectric sheets 18a through 18c. Therefore, the portions of the main ground conductor 22 in the areas A11 and A12 are more deformable than any portion of the main ground conductor 22 in the areas A13 through A15. Consequently, as illustrated in FIGS. 29 and 30, the cushion member C1 is deformed, and in section perpendicular or substantially perpendicular to the x-direction, the main ground conductor 22 becomes wavy.

In the flexible high-frequency signal line 10c having the structure above, as in the high-frequency signal line 10, the characteristic impedance is prevented from shifting from a designed value, and the above-described method allows production of the high-frequency signal line 10c.

Fourth Modification

A high-frequency signal line 10d according to a fourth preferred embodiment of the present invention and a manufacturing method thereof are hereinafter described with reference to the drawings. FIG. 31 is a sectional view of the high-frequency signal line 10d of the line portion 12a cut at an opening 30. The appearance of the high-frequency signal line 10d is as illustrated in FIG. 1.

The high-frequency signal line 10d is different from the high-frequency signal line 10 in the number of grooves G3 through G6 and in the number of protrusions P3 through P6. Insulators 60c through 60f are filled in the grooves G3 through G6 respectively.

In the flexible high-frequency signal line 10d having the structure above, as in the high-frequency signal line 10, the characteristic impedance is prevented from shifting from a designed value.

Other Preferred Embodiments

High-frequency signal lines and manufacturing methods thereof according to various preferred embodiments of the present invention are not limited to the high-frequency signal lines 10 and 10a through 10d and the manufacturing methods described above, and various changes are possible within the scope of the present invention.

It is possible to combine the structures of the high-frequency signal lines 10 and 10a through 10d, and it is possible to combine the processes in the manufacturing methods described above.

In the high-frequency signal lines 10 and 10a through 10d described above, the protective layers 14 and 15 are preferably formed by screen printing. However, the protective layers 14 and 15 may be formed by photolithography, for example.

The connectors 100a and 100b are not indispensable for the high-frequency signal lines 10 and 10a through 10d. In a case where the connectors 100a and 100b are not provided, the both ends of each of the high-frequency signal lines 10 and 10a through 10d are connected to circuit boards by solder or the like. It is also possible that only the connector 100a is provided at only one end of each of the high-frequency signal lines 10 and 10a through 10d.

In the high-frequency signal lines 10 and 10a through 10d, the connectors 100a and 100b are preferably mounted on the top surface. However, the connectors 100a and 100b may be mounted on the bottom surface. Also, the connector 100a may be mounted on the top surface of each of the high-frequency signal lines 10 and 10a through 10d, and the connector 100b may be mounted on the bottom surface of each of the high-frequency signal lines 10 and 10a through 10d.

Either one of the main ground conductor 22 and the auxiliary ground conductor 24 may be omitted from the high-frequency signal lines 10 and 10a through 10d. In other words, the high-frequency signal lines 10 and 10a through 10d may be microstriplines.

In each of the high-frequency signal lines 10 and 10a through 10d, instead of the main ground conductor 22, a ground conductor may be provided on the lower surface of the dielectric sheet 18b to extend along the signal line 20. In other words, the high-frequency signal lines 10 and 10a through 10d may be high-frequency signal lines having a coplanar structure.

In the high-frequency signal lines 10 and 10a through 10d, the groove G1 and protrusion P1, and the groove G2 and protrusion P2 are provided respectively on the both sides in the y-direction of the signal line 20. However, it is only necessary that the groove G1 and protrusion P1 or the groove G2 and protrusion P2 are provided on one side in the y-direction of the signal line 20.

In the high-frequency signal lines 10 and 10a through 10d, only the protrusions P1 and P2 may be provided on the main ground conductor 22, and it is not always necessary to make the grooves G1 and G2 on the main ground conductor 22. In this case, the second moment of area of the main ground conductor 22 with the protrusions P1 and P2 provided thereon is greater than the second moment of area of a flat main ground conductor 22 without the protrusions P1 and P2 provided thereon. Therefore, in the flexible high-frequency signal line with the protrusions P1 and P2, the characteristic impedance is prevented from shifting from a designed value.

Instead of the insulators 60a through 60f, conductors, for example, formed of a metal material may be used.

Each of the high-frequency signal lines 10 and 10a through 10d may be used, for example, as a high-frequency signal line in an RF circuit board such as an antenna front-end module.

As thus far described, the preferred embodiments of the present invention are useful in a high-frequency signal line and a manufacturing method thereof, and the preferred embodiments of the present invention provide the advantage of preventing a shift of the characteristic impedance of a flexible high-frequency signal line from a designed value.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high-frequency signal line comprising:
a linear dielectric body including flexible dielectric sheets laminated together in a direction of lamination;
a signal line provided at the dielectric body to extend along the dielectric body; and
a first ground conductor provided at the dielectric body to extend along the signal line, the first ground conductor including a first main surface and a second main surface opposed to each other in the direction of lamination; wherein
a strip-shaped protrusion extending along the signal line is provided on the second main surface of the first ground conductor such that the strip-shaped protrusion is not overlapped with the signal line when viewed from the direction of lamination.

2. The high-frequency signal line according to claim 1, wherein the strip-shaped protrusion extending along the signal line is located on the second main surface in a section of the dielectric body.

3. The high-frequency signal line according to claim 1, wherein the linear dielectric body including the flexible dielectric sheets includes protective layers disposed on respective ones of the flexible dielectric sheets.

4. The high-frequency signal line according to claim 1, wherein the signal line is a linear signal line defined by a linear conductor.

5. The high-frequency signal line according to claim 1, wherein the first ground conductor is covered by one of a protective layer and one of the flexible dielectric sheets.

6. The high-frequency signal line according to claim 1, wherein the material different from the insulating layer is one of an insulator and a protective layer.

7. The high-frequency signal line according to claim 1, wherein the linear dielectric body includes reinforcement ground conductors.

8. An electronic component comprising:
first and second high-frequency circuits; and
the high-frequency signal line according to claim 1; wherein
the first and second high-frequency circuits are connected to each other by the high-frequency signal line.

9. The electronic component according to claim 8, wherein the electric component is a cell phone.

10. A high-frequency signal line comprising:
a linear dielectric body including flexible dielectric sheets laminated together in a direction of lamination;
a signal line provided at the dielectric body to extend along the dielectric body; and
a first ground conductor provided at the dielectric body to extend along the signal line, the first ground conductor including a first main surface and a second main surface opposed to each other in the direction of lamination; wherein
a strip-shaped protrusion extending along the signal line is provided on the second main surface of the first ground conductor;
the first ground conductor is located on a first side of the signal line in the direction of lamination so as to face the signal line;
the first main surface is a main surface of the first ground conductor on the first side in the direction of lamination;
the second main surface is a main surface of the first ground conductor on a second side, which is an opposite side from the first side, in the direction of lamination;
the strip-shaped protrusion provided on the second main surface is defined by a curved portion of the first ground conductor that is curved to protrude to the second side in the direction of lamination in a section perpendicular or substantially perpendicular to the signal line;
a strip-shaped groove is defined on the first main surface by another curved portion of the first ground conductor that is curved to protrude to the second side in the direction of lamination in another section perpendicular or substantially perpendicular to the signal line;
an insulating layer is located on the first side of the first ground conductor in the direction of lamination; and
a material different from the insulating layer is filled in the strip-shaped groove.

11. The high-frequency signal line according to claim 1, wherein
the first ground conductor is located on a first side of the signal line in the direction of lamination so as to face the signal line;
the first main surface is a main surface of the first ground conductor on the first side in the direction of lamination;
the second main surface is a main surface of the first ground conductor on a second side, which is an opposite side from the first side, in the direction of lamination; and
the strip-shaped protrusion extending along the signal line is provided on the second main surface.

12. The high-frequency signal line according to claim 11, wherein, when viewed from the direction of lamination, the strip-shaped protrusion is located on at least one side of the signal line in a widthwise direction of the signal line.

13. The high-frequency signal line according to claim 12, wherein, when viewed from the direction of lamination, the strip-shaped protrusion is located on each side of the signal line in the widthwise direction of the signal line.

14. The high-frequency signal line according to claim 11, further comprising:
a second ground conductor provided at the dielectric body and located on the second side of the signal line in the direction of lamination to extend along the signal line.

15. The high-frequency signal line according to claim 11, wherein the strip-shaped protrusion provided on the second main surface is defined by a curved portion of the first ground conductor that is curved to protrude to the second side in the direction of lamination in a section perpendicular or substantially perpendicular to the signal line.

16. The high-frequency signal line according to claim 15, wherein
a strip-shaped groove is defined on the first main surface by another curved portion of the first ground conductor that is curved to protrude to the second side in the direction of lamination in another section perpendicular or substantially perpendicular to the signal line;
an insulating layer is located on the first side of the first ground conductor in the direction of lamination; and
a material different from the insulating layer is filled in the strip-shaped groove.

* * * * *